(12) United States Patent
Chen

(10) Patent No.: US 12,192,372 B2
(45) Date of Patent: Jan. 7, 2025

(54) SYSTEMS AND METHODS FOR PROVABLE PROVENANCE FOR ARTIFICIAL INTELLIGENCE MODEL ASSESSMENTS

(71) Applicant: CREDO.AI CORP., Palo Alto, CA (US)

(72) Inventor: Eli Chen, San Mateo, CA (US)

(73) Assignee: CREDO.AI CORP., Palo Alto, CA (US)

( * ) Notice: Subject to any disclaimer, the term of this patent is extended or adjusted under 35 U.S.C. 154(b) by 315 days.

(21) Appl. No.: 17/743,254

(22) Filed: May 12, 2022

(65) Prior Publication Data

US 2023/0370274 A1 Nov. 16, 2023

(51) Int. Cl.
| | |
|---|---|
| *H04L 9/06* | (2006.01) |
| *G06N 20/00* | (2019.01) |
| *H04L 9/08* | (2006.01) |
| *H04L 9/32* | (2006.01) |
| *H04L 9/40* | (2022.01) |

(52) U.S. Cl.
CPC ........... *H04L 9/3236* (2013.01); *G06N 20/00* (2019.01); *H04L 9/0643* (2013.01); *H04L 9/0825* (2013.01)

(58) Field of Classification Search
CPC ... H04L 9/3236; H04L 9/0643; H04L 9/0825; G06N 20/00
USPC .......................................................... 713/168
See application file for complete search history.

(56) References Cited

U.S. PATENT DOCUMENTS

| | | | | |
|---|---|---|---|---|
| 10,540,960 | B1* | 1/2020 | Jones | G06N 20/00 |
| 11,783,062 | B2* | 10/2023 | Lounsberry | G06F 21/6218 |
| | | | | 726/30 |
| 2007/0058803 | A1* | 3/2007 | Suga | H04L 63/12 |
| | | | | 380/30 |
| 2010/0235285 | A1* | 9/2010 | Hoffberg | G06Q 50/188 |
| | | | | 705/37 |
| 2020/0076707 | A1* | 3/2020 | Dukic | H04L 41/5009 |
| 2020/0380398 | A1* | 12/2020 | Weider | G06F 16/285 |
| 2021/0174625 | A1* | 6/2021 | Pinkerton | G06F 16/27 |
| 2021/0312302 | A1* | 10/2021 | Gaur | G06Q 20/401 |
| 2022/0224706 | A1* | 7/2022 | Peng | H04L 49/208 |
| 2022/0405235 | A1* | 12/2022 | Sahgal | G06F 16/2365 |
| 2022/0414492 | A1* | 12/2022 | Jezewski | G06N 5/04 |
| 2023/0018525 | A1* | 1/2023 | Kanagaraj | G06F 16/284 |
| 2023/0359973 | A1* | 11/2023 | Marzorati | G06T 19/006 |

(Continued)

OTHER PUBLICATIONS

Maya Kapoor; PROV-GEM: Automated Provenance Analysis Framework using Graph Embeddings; IEEE: Year:2021; pp. 1720-1727.*

(Continued)

*Primary Examiner* — Monjur Rahim
(74) *Attorney, Agent, or Firm* — Haley Guiliano LLP

(57) ABSTRACT

Systems and methods are described herein for providing provable provenance for assessment results. For example, an AI model and/or a dataset may be assessed using an assessment service to determine whether a bias exists within the AI model and/or the dataset. The results of the assessment may be provided to an auditing service to confirm the assessment results. The systems and methods described herein provide for provable provenance for the assessment results such that the auditing service can verify whether a model and validation dataset provided by a client are the same that were used during an assessment and have not been tampered with by a malicious party.

18 Claims, 9 Drawing Sheets

(56) References Cited

U.S. PATENT DOCUMENTS

2023/0359974 A1* 11/2023 Hintermeister ...... G06Q 10/067
2023/0370274 A1* 11/2023 Chen .................... H04L 9/0825

OTHER PUBLICATIONS

Menezes, A.J., et al., Editors, "Chapter 9: Hash Functions and Data Integrity," Handbook of Applied Cryptography, 321-383 (1996).

* cited by examiner

SYSTEMS AND METHODS FOR PROVABLE PROVENANCE FOR ARTIFICIAL INTELLIGENCE MODEL ASSESSMENTS

BACKGROUND

The present disclosure is directed to systems and methods for provable provenance for artificial intelligence model assessments.

SUMMARY

As more industries leverage artificial intelligence (AI) to make predictions and/or decisions from data, audits of these AI models (such as a machine learning model) have become increasingly important. For example, an AI model may be used to evaluate the resume of a job applicant and may subsequently make an employment recommendation for that applicant based on the output of the AI model. To reduce risk of unintended or unconscious bias impacting business decisions or operations (e.g., consistently rejecting or systematically undervaluing job applicants of certain protected classes), AI models are evaluated and assessed to determine whether such bias exists. In some instances, performing an assessment requires inputting a dataset into an AI model and evaluating the results. In some instances, assessments are performed on the input dataset, the AI model, and/or both the input dataset and the AI model. Assessment results and/or the input data may be provided to independent auditors to confirm whether such bias exists. Oftentimes, the auditor must simply trust that the provided input data was used to generate the corresponding assessment results. In some instances, the input data, the AI model, the assessment code, or the assessment results may be modified (whether intentionally or unintentionally) prior to providing such data to an auditor.

Oftentimes, auditors rely on provenance information to determine whether the assessment was generated based on the provided dataset and/or AI model. Provenance information may include information about the input data used, the algorithm applied, the version of a particular library, version of the AI model used in the assessment, etc. In some instances, provenance is provided using audit logs. Audit logs for an assessment may list versions of the dataset, AI model, and/or assessment algorithm used to perform the assessment. However, many companies do not maintain audit logs due to the significant cost in infrastructure, development, and maintenance required to maintain such logs, resulting in a lack of provable provenance for the assessment results. Additionally, audit logs are subject to modification or manipulation. A change to log entries corresponding to the dataset, the AI model, the assessment code, and/or the assessment results would be difficult to detect and could obviate or invalidate the results of an audit.

Accordingly, techniques are described herein that provide provable provenance for an AI model assessment. In particular, the systems and methods described herein allow for the verification of whether the provenance of an assessment result has been tampered with by, for example, a bad actor. Assessment results are vulnerable through a variety of attack vectors. For example, an attack vector may result in a modification to the AI model itself, the input validation dataset, the inference algorithms and/or the code used for the assessment, and the results of the assessment as a whole. In some instances, these modifications may be performed manually to eliminate the appearance of bias in the AI model. In other instances, these modifications may be the result of unchecked or unnoticed machine learning activity. The systems and methods described herein use signed code to attest to the authenticity of the assessment code, compute hash values for the AI model and validation dataset to detect tampering, and sign assessment results to detect falsification or gamification of the assessment results of the AI model.

In some embodiments, an assessment service receives a validation dataset and/or an AI model from a third party. For example, the assessment service may receive a set of job applicants' resumes (e.g., the validation dataset) and/or an AI model that recommends whether to hire or to not hire that individual. The code of the assessment service may be signed by a trusted party (e.g., the assessment service or a digital signing service) so that a third party (e.g., a verification service, an auditor, etc.) can verify whether the assessment code and results have been tampered with or modified.

The assessment service may apply an assessment framework to the AI model and/or the validation dataset. In some embodiments, many assessment frameworks are accessible to the assessment service that vary in purpose. These assessment frameworks may vary, such as by what criteria are required, how results are found, what format the results are in, whether the assessment applies to an AI model, a dataset, or both an AI model and a dataset, etc. The assessment service may identify the function associated with the retrieved validation dataset and/or AI model and the identified requirements for each of the plurality of available assessment frameworks of the validation dataset and/or AI model. For example, the assessment service may use an assessment framework aimed to detect a specific bias toward a protected class when assessing an AI model used in a hiring process, whereas the assessment service may use an assessment framework specific to finances when assessing an AI model used to predict stock market trends for financial trading. In another example, the assessment service may select an assessment framework to detect a specific bias toward a protected class when assessing a dataset comprising resumes, whereas the assessment service may use an assessment framework specific to finances when assessing a dataset comprising stock trades.

The assessment service may select an assessment framework by determining which assessment framework, of the plurality of assessment frameworks, comprises a set of requirements and metrics that match the function associated with the validation dataset and/or the AI model. For example, the assessment service may select an assessment framework designed to evaluate whether a race and/or gender-based bias exists in an AI model used to evaluate the resumes of job applicants.

The assessment service may generate output using the AI model for data in the validation dataset. For example, the assessment service may input each resume in the validation dataset into the AI model. For each resume, the AI model may, for example, generate an output, such as indication of whether to hire or to not hire an applicant. The assessment service may generate a vector comprising the outputs generated by the AI model for each of the resumes in the validation dataset.

The assessment service may generate assessment results by applying the selected assessment framework to the validation dataset and/or the AI model. For example, the assessment service may generate statistics, based on the output, to assess the performance of the AI model. For example, the assessment service may determine whether a race- and/or gender-based bias exists, by evaluating the output and determining whether a particular recommendation (e.g., to not hire) exists for a particular race and/or gender. In some examples, the assessment service may run the assessment on one or more of the AI model and the validation dataset. For example, the assessment service may run a fairness assessment on the validation dataset to determine whether the assessment dataset comprises a fair representation of samples from all races.

In some embodiments, the assessment service may generate the assessment results by identifying a metric associated with the selected assessment framework and a function to generate the metric. The assessment service may generate, a value for the metric by applying the function to the output of the AI model (e.g., the vector of hire or not hire recommendations). For example, when assessing the hiring recommendation AI model, the assessment service may generate a first set of statistics for the recommended hires and a second set of statistics for the recommended not hires. The assessment service may determine, based on the output, whether a race- and/or gender-based bias exists in the hiring recommendations by evaluating the statistics. For example, the assessment service may determine that a bias exists when a statistically significant difference exists between hire recommendations for equally qualified male and female applicants.

In some instances, code of the assessment framework may be signed by a trusted party (e.g., when the assessment framework is external to the assessment service) or may run on a microservice of the trusted assessment service. In instances where the assessment framework is signed, the assessment service may verify the signature of the selected assessment framework prior to applying the assessment framework during validation.

In some embodiments, the assessment service generates a hash value of the validation dataset and/or of the AI model to protect against tampering with the AI model or the validation dataset. For example, the assessment service may perform a one-way hash function on the validation dataset and the code and weights assigned within the AI model to generate a first hash value of the validation dataset and a second hash value of the AI model to compare against for subsequent results validation. The one-way hashing function may not rely upon the order of the data in the validation dataset or of the AI model. In such instances, the assessment service may generate the hash value for the AI model and the validation dataset so that a receiving party (e.g., an assessment verification service) may verify whether the AI model and/or validation dataset was tampered with during transmission.

In some embodiments, the assessment service may combine the assessment results, the first hash value of the validation dataset and the second hash value of the AI model so that the combined results may be signed and provided to a verification service (e.g., an auditor). For example, the assessment service may generate a data structure comprising the first hash value, the second hash value, and the assessment results. The assessment service may utilize a private key from a trusted party to sign the results.

In some embodiments, the assessment service provides the signed results and a certificate to a verification service (e.g., an auditor). For example, the certificate may comprise a public key corresponding to the private key of the trusted party who signed the results. The verification service may utilize the certificate provided by the assessment service to verify whether the signed results were tampered with prior to receipt. For example, the verification service may verify that the results can be accurately decrypted using the public key of the trusted party. When the signed results can be accurately decrypted (e.g., when the decryption results in the expected data structure comprising the assessment results, the dataset hash and the model hash), the verification service may confirm that the results were not tampered with prior to receipt. If the signed results cannot be accurately decrypted, the verification service may determine that the results were tampered with and therefore the provenance is invalid.

In some embodiments, the verification service may verify whether tampering occurred within a validation dataset and AI model of a third party, the subsequent assessment results, and/or any combination thereof. The verification service may generate a first hash value for the validation dataset and a second hash value for the AI model provided by the third party to the verification service. The verification service may compare the generated first and second hash values to the first and second hash values provided by the trusted assessment service that used the same validation dataset and AI model. When the first hash values and the second hash values match, the verification service may confirm that the dataset and the AI model provided by the third party were used to generate the assessment results and that those assessment results were not tampered with prior to the receipt of the assessment results by the verification service. In contrast, when the first hash values and the second hash values do not match, the verification service may determine that the validation dataset and the AI model provided by the third party were tampered with prior to the verification service receiving the assessment results from the assessment service and the input validation dataset and AI model from the third party. Accordingly, the verification service may prove the provenance of the assessment results by verifying the legitimacy of each of the inputs to the assessment service and the validity of the signed results from the assessment service.

BRIEF DESCRIPTION OF THE DRAWINGS

The below and other objects and advantages of the disclosure will be apparent upon consideration of the following detailed description, taken in conjunction with the accompanying drawings, in which like reference characters refer to like parts throughout, and in which.

DETAILED DESCRIPTION

Artificial intelligence has been increasingly used by industry to quickly make predictions and decisions based on data. For example, a bank may decide whether to grant a loan to an applicant by inputting the applicant's loan package (e.g., financial information, employment history, etc.) to a trained AI model used to predict whether an applicant will default on a loan. Because models are used to make decisions that impact the lives of individuals, it is important to ensure that the model does not contain any unintended bias (e.g., rejecting all applicants of a particular race).

An entity may perform an assessment on a model to ensure that no unintended bias exists in the model (e.g., an assessment to ensure that a racial bias does not exist when evaluating the loan applications). Because of the importance in ensuring that the model does not have unintended bias, the assessment results are often verified by a verification service (e.g., a third-party auditor). However, an entity or a bad actor may try to game or cheat the assessment and/or verification process to provide the illusion of a bias-free model where one does exist. For example, a bad actor may modify the assessment results, the validation data, the trained model, etc. to remove a racial bias so that it seems like a trained AI model does not contain a bias when it does.

Figure 2:
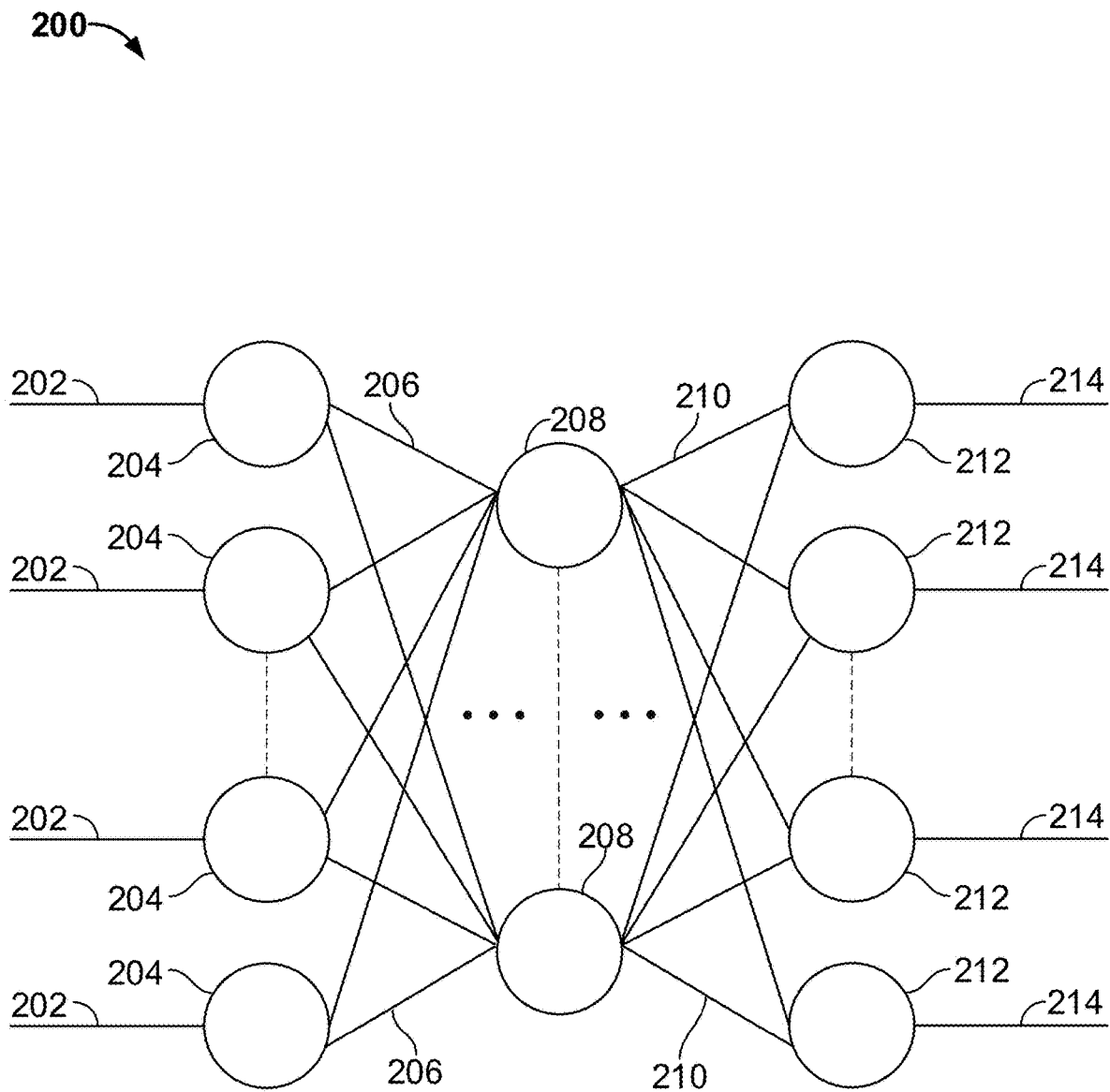
FIG. 2 shows an illustrative diagram of an AI model, in accordance with some embodiments of the disclosure.

Accordingly, systems and methods are described herein for providing provable provenance for a model assessment (e.g., a trained AI model assessment). By providing a provable provenance, a verification service (e.g., an auditor) can ensure that the model, the validation dataset, the assessment results, etc., have not been tampered with when verifying an assessment of a model. The model may vary in form or type, such as a trained machine learning model, a trained neural network, a linear regression model, a logistic regression model, a decision tree, a linear discriminant analysis model a Naïve Bayes model, a support vector machine, a random forest, etc. In some embodiments, the model is an AI model as depicted in FIG. 2 and described further below.

In the following description, numerous specific details are set forth to provide thorough explanation of embodiments of the present disclosure. It will be apparent, however, to one skilled in the art, that embodiments of the present disclosure may be practiced without all of these specific details. In other instances, certain components, structures, and techniques have not been shown in detail in order not to obscure the understanding of this description of this disclosure.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially. The system and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, Random Access Memory ("RAM"), a solid state drive ("SSD"), etc.

A bad actor may attempt to attack a model assessment and/or verification by modifying the assessment results, the input validation dataset, the input model, the algorithms and/or the code of the assessment service, itself, or by other vulnerabilities available through a variety of attack vectors. This tampering of assessment results may be implemented intentionally (e.g., to eliminate the appearance of bias in the AI model) or unintentionally as the result of faulty code, unchecked or unnoticed machine learning activity within the AI model/assessment service, etc. In some embodiments, the systems and methods herein use signed code to attest to the authenticity of the assessment code, compute hash values for the AI model, validation dataset, and/or assessment results to detect tampering, and sign assessment results to detect falsification or gamification of the assessment results for the AI model. Additionally, a trusted party may sign the assessment results so that a third party (e.g., a verification service, an auditor, etc.) can verify whether the assessment code and assessment results have been tampered with or modified.

Figure 1:
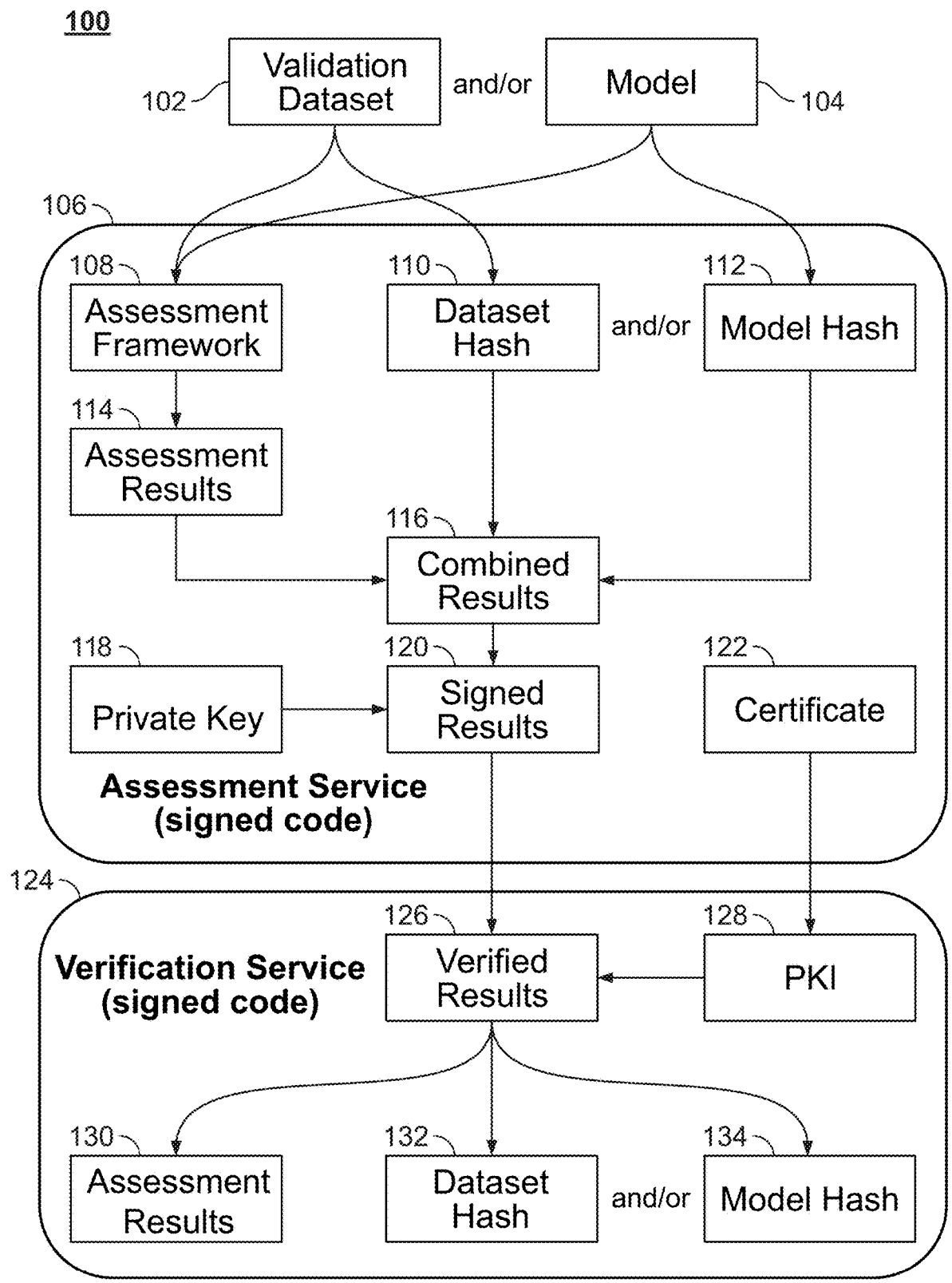
FIG. 1 shows an illustrative diagram of an artificial intelligence system for assessing AI models using validation datasets and providing provable provenance for the assessment results, in accordance with some embodiments of the disclosure.

FIG. 1 shows an illustrative diagram of system 100 for assessing AI models using validation datasets and providing provable provenance for the assessment results, in accordance with some embodiments of the present disclosure. For example, system 100 may assess whether an AI model used to evaluate loan applications contains a racial bias, and will provide provable provenance for the results of the assessment. System 100 provides for provable provenance of the assessment results by protecting the assessment results from multiple attack vectors. For example, system 100 protects from modification and/or attacks by a malicious party: the model, the data used to assess the model, the code used to make inferences from the AI model, the code running the assessment, and the results of the assessment. For example, system 100 is depicted having signed code for performing an assessment. By signing the code that performs the assessment (e.g., assessment service 106), the code is protected from modifications by an attacking party. System 100 is depicted generating a hash value for validation dataset 102 and model 104 (e.g., dataset hash 110 and model hash 112, respectively). By generating the hash values for the validation dataset (e.g., validation dataset 102) and the model (e.g., model 104), system 100 provides for a way of verifying that validation dataset 102 and model 104 were not tampered with prior to receipt by verification service 124.

System 100 may be implemented in software and/or hardware of a computing device, such as server 302, which is described further below with respect to FIG. 3. In some embodiments, some or all of system 100 comprises a combination of hardware and software components. In some instances, system 100 provides for provable provenance of the assessment results by the hardware and/or software components of system 100 may be protected against tampering. For example, the software components of system 100 may comprise signed code. In such instances, system 100 may verify a signature of the software component prior to execution.

System 100 is depicted having assessment service 106, for e.g., performing an assessment of the model and/or dataset used to evaluate loan applications, and verification service 124, for e.g., verifying the results of the assessment and proving provenance of the assessment results. When the code for assessment service 106 and/or verification service 124 is signed, system 100 may verify the signatures of the code prior to execution. When system 100 cannot verify the signatures of either assessment service 106 and or verification service 124, provenance will fail (e.g., because the code has been tampered with and therefore cannot be trusted).

In some embodiments, system 100 assesses a trained machine learning model, such as the model depicted in FIG. 2. For example, system 100 may assess only the trained machine learning model for, e.g., adversarial robustness. In other embodiments, assessment service 106 may perform an assessment of a model (e.g., model 104) using a validation dataset (e.g., validation dataset 102) to determine whether an unintended bias exists within the model (e.g., model 104). For example, assessment service 106 may receive from a client (e.g., client 308, which is described further below with respect to FIG. 3) validation dataset 102 and model 104. In an example, validation dataset 102 may comprise a matrix of loan application packages. Each row in the matrix may include data about a loan applicant, such as the applicant's name, age, gender, race, income, etc. and financial information about the loan, such as the desired loan amount and term. In some embodiments, assessment service 106 receives validation dataset 102 from a database over a network (e.g., from database 306 via network 304, depicted in FIG. 3). In this example, model 104 may be a trained machine learning model used to recommend whether to grant or deny a loan based on a loan application package (e.g., the data from a row in the matrix).

Assessment service 106 may assess model 104 by inputting validation dataset 102 to model 104 and analyzing the output of model 104 using an assessment framework (e.g., assessment framework 108). For example, assessment service 106 may input each loan application package from validation dataset 102 into model 104 to generate a loan approval or denial output from model 104. An exemplary process for generating an output from a model is discussed further below with respect to FIG. 2. Assessment service 106 may then analyze the output of model 104 (e.g., the denial or approval outputs relative to the loan application package) to determine whether a bias exists.

In some embodiments, assessment service 106 may receive validation dataset 102 from a different source than the model 104. For example, client 308 may select a validation dataset from a library of validation datasets stored in a database (e.g., database 306) based upon the intended use of model 104 (e.g., when model 104 evaluates loan applications, client 308 may select a validation dataset comprising loan application data).

In some embodiments, assessment service 106 may assess validation dataset 102 (e.g., without also assessing model 104) to generate assessment results 114. For example, assessment service 106 may apply an assessment framework to validation dataset 102 to determine whether a bias exists within the samples selected for validation dataset 102. For example, control circuitry 406 may apply a fairness assessment to validation dataset 102 to determine whether the racial distribution of samples withing validation dataset 102 fairly represents individuals across all races.

In some embodiments, assessment service 106 may select a particular assessment framework, from a set of multiple assessment frameworks, based on the dataset (e.g., validation dataset 102) and/or the trained machine learning model (e.g., model 104). In some instances, the selection occurs automatically without requiring a user selection of a particular assessment framework. For example, assessment service 106 may access multiple assessment frameworks (e.g., via database 306), where each assessment framework assesses different parameters of a model (e.g., different biases, model performance, fairness, etc.). For example, a first assessment framework may assess whether a racial bias exists in a model, whereas a second assessment framework may assess whether a financial bias exists in a model, whereas a third assessment may assess a computation performance of the model, etc.

In some instances, each assessment framework is associated with a set of requirements, such as a set of features or functions that a model and/or dataset must instantiate in order for assessment service 106 to run the assessment. Assessment service 106 may automatically select and run each of the assessment frameworks where the requirements match a function associated with the model (e.g., model 104) and/or dataset (e.g., validation dataset 102). For example, assessment service 106 may select a particular assessment framework from the multiple assessment frameworks by identifying a respective set of requirements associated with each assessment framework and by matching a function associated with the dataset and/or the trained machine learning model. For example, when model 104 outputs a probability function (e.g., a probability of whether a loan for a given applicant will default in the future), assessment service 106 may automatically run each of the assessments corresponding to models that output a probability. In such instances, assessment service 106 may generate a plurality of different assessment results (e.g., assessment results 114) corresponding to each of the selected assessments.

In some embodiments, assessment service 106 selects an assessment framework based on an indication by a client (e.g., client 308). For example, when client 308 has a particular assessment need, such as a need to evaluate whether a racial bias exists in a model, client 308 may transmit (e.g., over network 304) an indication of a particular assessment framework (e.g., an assessment framework to determine whether a bias exists in a model) to assessment service 106. In such instances, assessment service 106 may run the particular assessment (e.g., the assessment framework to determine whether a bias exists in a model or an assessment framework to determine whether a bias exists in a dataset) to generate assessment results 114. In some embodiments, assessment service 106 may receive the assessment framework from a third party, such as client 308 over network 304.

In some embodiments, assessment service 106 may verify a signature of the assessment framework prior to using an assessment framework to assess the model. For example, assessment service 106 may decrypt a signature of a candidate assessment framework using a public key to produce the original hash value for the assessment framework. Should assessment service 106 determine that the decrypted hash value for the assessment framework does not match a hash value of the assessment framework generated by assessment service 106, assessment service 106 will determine that the assessment framework has been tampered with and cannot be utilized. When assessment service 106 can verify the signature of a candidate assessment framework, assessment service 106 may utilize the candidate assessment framework to generate assessment results (e.g., assessment results 114).

Assessment service 106 may generate assessment results 114 by identifying a metric associated with the assessment framework (e.g., assessment framework 108) and by selecting a function corresponding to the metric. Assessment service 106 may apply the function to the output of model 104 to generate the metric. For example, when assessment framework 108 is an assessment framework used to determine whether racial bias exist in a model (e.g., model 104), the metric may be a percentage of loan applications that were denied and the percentage of loan applications that were approved for each racial classification. Assessment service 106 may select a function to compute the percentage of denials/approvals of loan applications and may execute the function for each racial classification. For example, when 50% of Hispanic applicants in validation dataset 102 are approved for a loan by model 104 and 50% of Asian applicants in validation dataset 102 are approved for a loan by model 104, assessment service 106 may generate assessment results 114 indicating that 50% of Hispanic applicants and 50% of Asian applicants were approved for the loan by model 104 and that 50% of Hispanic applicants and 50% of Asian applicants were denied for the loan by model 104.

Although the example above correlates a single output factor (e.g., denial/approval) with a single input factor (e.g., race), in some embodiments, the assessment framework may correlate one or more output factors (e.g., approval/denial status and maximum approved loan amount) with one or more input factors (e.g., race and income). For example, assessment framework 108 may analyze the output of model 104 to determine the income brackets in addition to the race of the approved loan applications (e.g., determine that 80% of Asian applicants who make greater than $100,000 per year were approved for a loan of $50,000 or greater whereas 40% of Hispanic applicants who make greater than $100,000 per year were approved for a loan of $50,000). In this example, assessment service 106 may determine that a bias exists in model 104 because of the detected disparity between the loan approvals for Hispanic applicants as compared to Asian applicants.

In some embodiments, assessment service 106 may combine assessment results 114 with hash of validation dataset 102 and a hash of model 104 to generate combined results 116. In some embodiments, the assessment service may create a data structure comprising three fields. For example, the assessment service may input a hash of validation dataset 102 in the first field, the hash value of model 104 in the second field, and assessment results 114 in the third field. For example, assessment service 106 may generate hash of validation dataset 102 (e.g., dataset hash 110) and a hash of model 104 (e.g., model hash 112) using a one-way hashing function that does not depend on the order of the elements within validation dataset 102 or model 104. For example, assessment service 106 may generate a hash of the AI model by applying the one-way hashing function to the code and weights of the AI model. In another example, assessment service 106 may generate dataset hash 110 by calculating a hash sum of the entire dataset so that the order of the elements within validation dataset 102 does not matter for computing the hash value. By generating the hashes for validation dataset 102 and model 104, a verification service (e.g., verification service 124) can verify whether a validation dataset and a model provided by assessment service 106 to verification service 124 are the same model and validation dataset used by assessment service 106 to generate assessment results 114 (discussed further below with respect to FIG. 9). For example, if model 104 and/or validation dataset 102 is tampered with by a malicious third party during transmission to verification service 124, the respective hash values for the tampered model and/or tampered validation dataset will not match dataset hash 110 and/or model hash 112. Although assessment results 114, dataset hash 110 and model hash 112 are depicted as being combined prior to signing, in some embodiments, assessment service 106 separately signs each of assessment results 114, dataset hash 110, and model hash 112 and may separately transmit each to verification service 124.

In some embodiments, assessment service 106 generates signed results 120 by signing combined results 116 with private key 118. Assessment service 106 may generate signed results 120 prior to transmitting signed results over a network to verification service 124. By signing the combined results with a private key, assessment service 106 can securely transmit the results over a network connection (e.g., network 304) to verification service 124. Should a malicious third party tamper with the transmission of signed results 120, the resulting transmission received by verification service 124 could not be verified using the public key of assessment service 106 (e.g., using certificate 122 corresponding to private key 118). Although FIG. 1 depicts signing combined results 116 using the private key of assessment service 106 to ensure that combined results 116 are not tampered with during transmission, any cryptographic system or algorithm can be used to ensure that combined results 116 are not tampered with during transmission without departing from the scope of the present disclosure. Although assessment service 106 is depicted having private key 118, signed results 120, and certificate 122, in some embodiments, private key 118, signed results 120, and certificate 122 are generated and/or provided by a trusted party (e.g., a trusted server) instead of or in combination with assessment service 106.

In some embodiments, assessment service 106 transmits both the signed combined results (e.g., signed results 120), which include assessment results 114, the hash value of the validation dataset (e.g., dataset hash 110), and the hash value of the AI model (e.g., model hash 112), and a certificate (e.g., certificate 122) to a third party (e.g., verification service 124). The certificate may comprise a public key corresponding to the private key used to sign the results (e.g., private key 118). In some embodiments, the third-party verification service (e.g., verification service 124) may utilize the certificate provided by assessment service 106 with the signed combined results (e.g., signed results 120) to verify whether the signed results were tampered with prior to receipt. For example, verification service 124 may verify that the results can be accurately decrypted using the public key of the trusted party (e.g., by utilizing PKI 128 corresponding to certificate 122). When the signed results can be accurately decrypted (e.g., by confirming that the expected data structure exists in verified results 126), the verification service may confirm that the results were not tampered with prior to receipt. If the signed results cannot be accurately decrypted, verification service 124 may determine that the results were tampered with and therefore the provenance is invalid.

In some embodiments, verification service 124 is a third party, such as an auditing service, that verifies whether an assessment performed on model 104 and validation dataset 102 has been accurately performed by assessment service 106, without tampering by a malicious party. For example, verification service 124 may generate verified results 126 by decrypting the received signed results 120 using PKI 128 from certificate 122. Should verification service 124 determine that the signature of signed results 120 cannot be verified using PKI 128, verification service 124 may determine that signed results 120 were tampered with during transmission (and therefore verification of provenance would fail). In contrast, if verification service 124 can verify the signature of signed results 120, verification service 124 generates verified results 126. In some embodiments, verified results 126 contain the data structure of combined results 116 (e.g., a first field comprising dataset hash 110, a second field comprising model hash 112, and a third field comprising assessment results 114), and verifying whether the results were tampered with during transmission comprises determining that the data structure exists in verified results 126. In such instances, verification service 124 may store the assessment results from verified results 126 as assessment results 130, the dataset hash from verified results 126 as dataset hash 132 and the model hash from verified results 126 as model hash 134.

In some instances, verification service 124 may generate a hash value for the validation dataset and a hash value for the model and may compare the respective hash values to those hash values in the verified results. By comparing the hash values, verification service 124 may verify whether the validation dataset (e.g., validation dataset 102) or the model (e.g., model 104) were modified from their original values. For example, verification service 124 may receive validation dataset 102 and model 104 (e.g., via network 304) and may generate a hash for validation dataset 102 and a hash for model 104. In such instances, verification service 124 may compare the hash for validation dataset 102 and the hash for model 104 to dataset hash 132 and model hash 134, respectively. When the hash for validation dataset 102, generated by verification service 124 does not match dataset hash 132, verification service 124 may determine that verification of provenance has failed at least because the dataset was modified from its original value. When the hash for model 104, generated by verification service 124, does not match model hash 134, verification service 124 may determine that verification of provenance has failed at least because the model was modified from its original value.

Although assessment service 106 and verification service 124 are depicted as two discrete services, in some embodiments, a single computing device, such as server 302, implements all of the functions of assessment service 106 and/or verification service 124. In other embodiments, the functions of assessment service 106 and/or verification service 124 may be distributed across multiple computing devices (e.g., multiple servers 302). For example, a first server (e.g., server 302) may execute code to retrieve and store a plurality of assessment frameworks and a second server (e.g., server 302) may execute code to generate assessment results based on an assessment framework. In either embodiment, the code corresponding to assessment service 106 or verification service 124 may be signed. In such instances, system 100 will verify the signature of the code prior to executing the code. Should system 100 fail to verify the signature of assessment service 106 or verification service 124, system 100 may determine that provenance will fail (e.g., because the code of assessment service 106 or verification service 124 may have been tampered with, and therefore cannot be trusted.

Accordingly, system 100 proves provenance of a set of assessment results (e.g., assessment results 114) by providing a provable method for ensuring that validation dataset 102 and model 104 are used to generate assessment results 114 using assessment service 106 running on a trusted platform (e.g., via signed code) via a trusted assessment framework (e.g., via a signed assessment framework). For example, when verification service 124 cannot decrypt signed results 120 using PKI 128, verification service 124 may determine that provenance has failed because of a modification to the signed results after signing. In another example, verification service 124 may determine that proof of provenance fails when the decrypted first hash value (e.g., dataset hash 132) does not match the first hash value (e.g., dataset hash 110). In such instances, verification service 124 may determine that validation dataset 102 was modified prior to generating the assessment results (and therefore provenance would fail) or the combined results were modified prior to signing. In another example, verification service 124 may determine that proof of provenance fails when the decrypted second hash value (e.g., model hash 134) does not match the second hash value (e.g., model hash 112). In such instances, verification service 124 may determine that model 104 was modified prior to generating the assessment results (and therefore provenance would fail) or the combined results were modified prior to signing. The aspects outlined in system 100 may be combined in any suitable combination, taken in part, or as a whole.

Although, assessment service 106 is depicted having, as input, both validation dataset 102 and model 104, in some instances, assessment service 106 may receive one of validation dataset 102 or model 104. For example, assessment service 106 may receive validation dataset 102 and may perform an assessment on only validation dataset 102. When assessment service 106 receives only validation dataset 102, assessment service 106 may not generate model hash 112. In other instances, assessment service 106 may only receive model 104 as input. Assessment service 106 may run an assessment on model 104 using, e.g., a stored validation dataset to perform the assessment on model 104.

FIG. 2 shows an illustrative diagram of an AI model in accordance with some embodiments of the disclosure. Model 200 may vary in form or type, such as a trained machine learning model, a trained neural network, a linear regression model, a logistic regression model, a decision tree, a linear discriminant analysis model a Naïve Bayes model, a support vector machine, a random forest, etc. In some embodiments, model 200 may be utilized by the systems described herein (e.g., system 100) to generate assessment results by applying an assessment framework (e.g., assessment framework 108) to model 200 (e.g., depicted as model 104 in FIG. 1) using a validation dataset (e.g., validation dataset 102). For example, model 200 may be a trained AI model, such as a neural network, used to predict whether a loan applicant will default on a loan, and/or compute a maximum loan amount, for a given loan application package (e.g., financial information about the loan and loan applicant).

Model 200 is depicted having input nodes 204, hidden nodes 208, and output nodes 212. Input nodes 204 are connected to hidden nodes 208 via connection 206, and hidden nodes 208 are connected to output nodes 212 via connection 210. Although model 200 is depicted having only three layers, any number of layers may be present, each layer may comprise any number of nodes and each node may have any number of connections to other nodes. Input data elements 202 are provided as input to input nodes 204, and output data elements 214 are the output generated by model 200 from output nodes 212. In some embodiments, assessment service 106 applies validation dataset 102 as inputs to input data elements 202 to generate an output (e.g., assessment service 106 may input a loan application to model 200 to generate an output of whether to grant or deny the loan).

In some embodiments, model 200 is a trained AI model. For example, model 200 may comprise weights assigned to connections 206 and 210. In some embodiments, system 100 trains model 200 by computing the weights to assign to each of connections 206 and 210. For example, client 508 (discussed further below with respect to FIG. 5) may assign initial weights to connections 206 and 210 based on an approximation of the distribution of weights, may randomly assign weights (e.g., a randomly assigned value between zero and one), or may initialize all weights to the same value (e.g., all 0.1). In some embodiments, client 508 may select the weights based on parameters specific to a client (e.g., an expected importance of various engagement campaign data parameters for a client).

After assigning weights to connections 206 and 210, client 508 may compare the output of the model to determine whether it corresponds to the provided input. For example, for a loan application where the loan applicant would normally be granted, client 508 may apply the loan application as input to model 200 and may determine whether the output of model 200 (e.g., via output data elements 214) indicates that the loan should be granted. If client 508 determines that the output does not correspond to the input (e.g., a loan that should be granted is denied), client 508 may modify the weights between the nodes until the desired output is observed (e.g., loan applications that should be granted are granted and applications that should be denied are denied). In some embodiments, client 508 trains model 200 using a training dataset, different from validation dataset 102 (e.g., a dataset stored on database 508). In some embodiments, client 508 trains model 200 and then transmits model 200 (e.g., after training, over network 304) to assessment service 106 so that assessment service 106 can perform an assessment of model 200 (e.g., an assessment of the performance of model 200, an assessment of whether model 200 contains a bias, etc.). For example, after client 508 trains model 200 to determine whether a loan application should be granted or denied (e.g., based on a probability of default for the loan), client 508 may transmit model 200 over network 508 to assessment service 106 so that assessment service 106 can determine whether model 200 has any unintended racial biases.

While model 200 is depicted having four input nodes 204, any number of input nodes may be used without departing from the scope of the present disclosure. In some embodiments, server 302 may select the number of input nodes 204 to model 200 based on the number of components of the input data. For example, the number of input data elements 202 may be computed based on a number of factors evaluated in the loan application (e.g., an input node for age, an input node for income, an input node for gender, etc.). In some embodiments, the input to model 200 is a vector comprising training or validation data.

In some embodiments, when client 508 is training model 200, client 508 may apply a training dataset to input nodes 204 and may compute values for hidden nodes 208 based on the input applied to input nodes 204 and the weights of connections 206. As an example, when the weights of connections 206 are 0.1 (e.g., because they were instantiated to initial values of 0.1) and the values of input nodes 204 are all 1, client 508 may compute the values for hidden nodes 208 to be all 0.4. Although model 200 is depicted having only one layer of hidden nodes, any number of layers having hidden nodes may be present in model 200. In some instances, hidden nodes 208 represent the most compressed version of input data elements 202. In some instances, the number of input nodes 204 may be larger than the number of hidden nodes 208. In such instances, when client 508 computes the values for hidden nodes 208 from the values of input nodes 204, client 508 encodes the input data to a compressed form (e.g., fewer nodes represent the input data). Client 508 may compute the value for output nodes 212 based on connections 210 between hidden nodes 208 and output nodes 212. For example, client 508 may assign all connections 210 weights of 1. Client 508 may compute the value of output nodes 212 to be 0.8.

In some embodiments, client 508 may compute an error value between input data elements 202 and output data elements 214 to generate an error value and may update the weights between nodes based on the error value. For example, client 508 may compute a first error value corresponding to output data elements 214 (e.g., having a value of 0.8) by subtracting 0.8 and an expected output value (e.g., an expected probability of not having a default on a loan application of 0.9). In such instances, client 508 may use the error value to tweak the weights for connections 206 and 210 between input nodes 204 and output nodes 212. Client 508 may continue an iterative process of updating the weights for various connections in the model until it finds an appropriate fit for the data (e.g., the error value is an acceptable value such that model 200 is not overfit to the input data nor underfit to the input data).

In some embodiments, when assessing model 200, assessment service 106 may generate output for model 200 using validation dataset 102. For example, assessment service 106 may provide input data elements 202 (e.g., data corresponding to validation dataset 102) as the input to input nodes 204 when assessing model 200. For example, assessment service 106 may retrieve a vector of input elements from validation dataset 102 (e.g., age, gender, income, etc., of a loan applicant) and may apply each input element from the vector to each input data element 202 (e.g., age to a first input data element, gender to a second input data element, etc.). Assessment service 106 may utilize the weights of connections 206 and 210 to compute the values for each of the nodes in model 200. For example, assessment service 106 may use the weight of connection 206 between input node 204 and hidden node 208 to compute the value for hidden node 208 (e.g., by multiplying a value of input node 204 by a weight of connection 206). In some embodiments, assessment service 106 may iterate through each element in validation dataset 102 when generating the output. For example, when validation dataset 102 comprises 1,000 loan applications, assessment service 106 may generate 1,000 different outputs by iterating each loan application through model 200 as described above. In some embodiments, assessment service 106 may assess the output of model 200 (e.g., the 1,000 outputs corresponding to the 1,000 loan applications) by applying assessment framework 108 to generate assessment results 114 (described further below with respect to FIG. 7.

The aspects outlined above of FIG. 2 may be combined in any suitable combination, taken in part, or as a whole.

Figure 3:
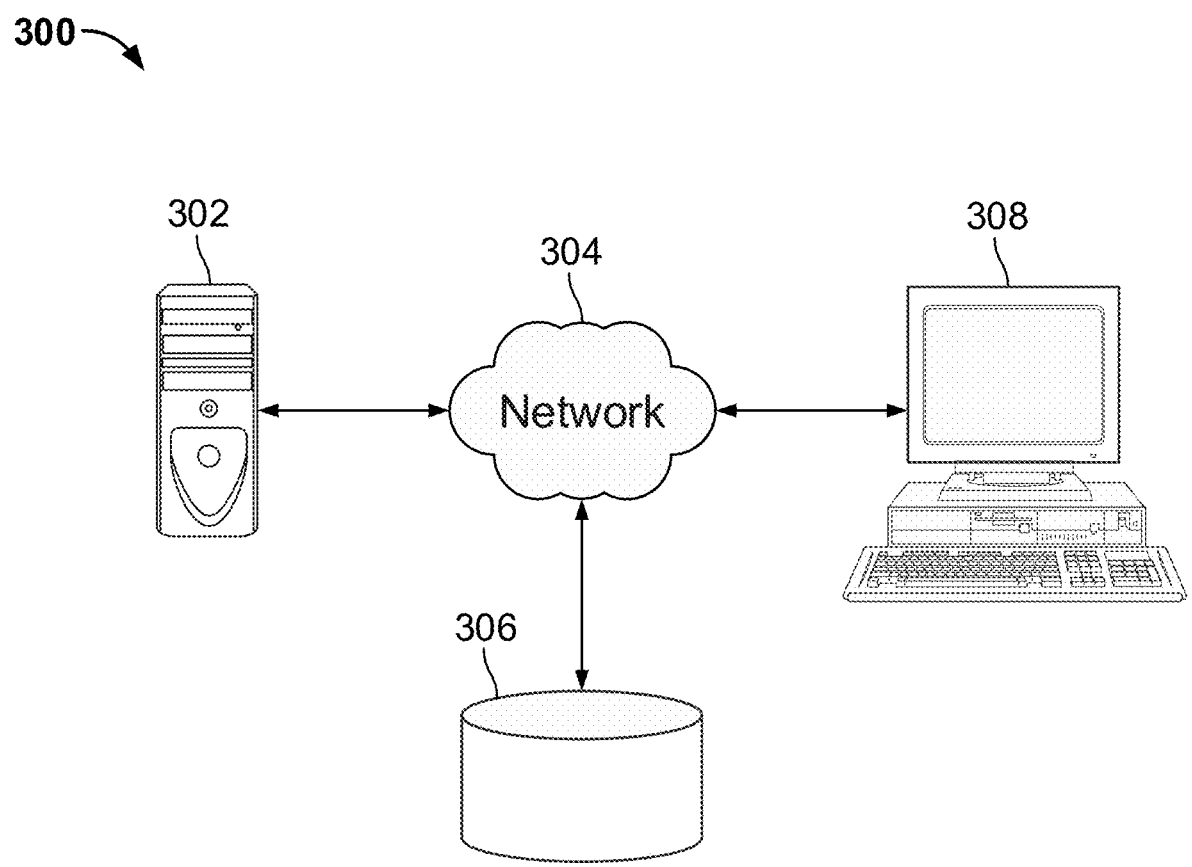
FIG. 3 shows an illustrative diagram of a network configuration, in accordance with some embodiments of the disclosure.

FIG. 3 shows an illustrative diagram of a network configuration, in accordance with some embodiments of the disclosure. System 300 is depicted having server 302, network 304, database 306 and client 308. In some embodiments, system 100 may comprise some or all the devices depicted in system 300. While FIG. 3 depicts only one type of each device to avoid over complicating the drawing, multiples of each of the devices may be used. Additionally, various configurations of devices and networks may be implemented without departing from the scope of the present disclosure. For example, connections between devices and networks may be wired or wireless. Server 302 may include one or more computing devices (e.g., computing device 400 discussed further below with respect to FIG. 4) and may implement system 100 and/or any of the components, systems, or processes described above or below. Server 302 is communicatively coupled to client 308 and database 306 via network 304. Network 304 may be any combination of component(s) and/or device(s) that enables server 302 to communicate with database 306 and/or client 308.

Database 306 may include one or more computing devices (e.g., computing device 400 discussed further below with respect to FIG. 4) and may implement system 100 and/or any of the components, systems, or processes, described above or below. In some embodiments, database 306 may be implemented on a remote device (e.g., a server on a different local network than server 302). In such instances, server 302 may communicate with database 306 over a network connection of server 302 that is connected to the Internet via a router of network 304. In some embodiments, database 306 is local to server 302 (e.g., database 306 may be implemented on storage circuitry that is local to server 302, such as storage circuitry 408). In such instances server 302 may communicate with database 306 via Serial ATA bus.

Database 306 may store any data and/or dataset descrybed herein, such as validation dataset 102, model 104, assessment frameworks 108, hashing formulas used to compute dataset hash 110 and model hash 112, private key 118, signed results 120, certificate 122, verified results 126, PKI 128, the hash function used to find validation dataset hash 132 and model hash 134, the signed code for assessment service 106, and the signed code for verification service 124. System 100 may retrieve any combination of validation dataset 102, model 104, assessment frameworks 108, hashing formulas used to compute dataset hash 110 and model hash 112, private key 118, signed results 120, certificate 122, verified results 126, PKI 128, the hash function used to find validation dataset hash 132 and model hash 134, the signed code for assessment service 106, and the signed code for verification service 124 to perform the processes described herein. In some embodiments, database 306 is implemented on a computing device, such as computing device 400, having a general-purpose processor. In such embodiments, some of the elements of the processes and methods described herein may occur on server 302 serially or in parallel to processing occurring on database 306.

Client 308 is communicatively coupled to server 302 and/or database 306 via network 304. Client 308 may be implemented on a computing device, such as computing device 400. In some embodiments, client 308 stores (either locally or remote to client 308) a model (e.g., model 200 and/or model 104). In some embodiments, client 308 may train a model (e.g., model 200 and/or model 104, based on a training dataset) and may transmit (e.g., over network 304) the model and a validation dataset (e.g., validation dataset 102) to server 302. In some embodiments, in response to receiving the model (e.g., model 200 and/or model 104) and the validation dataset, server 302 may perform an assessment of model 200 as described above and below. Upon performing the assessment, server 302 may transmit the signed assessment results (e.g., signed results 120) over network 304 to a third party (e.g., a second client, such as client 308) to validate the assessment results and validate the provenance of the assessment results.

The aspects outlined above of FIG. 3 may be combined in any suitable combination, taken in part, or as a whole.

Figure 4:
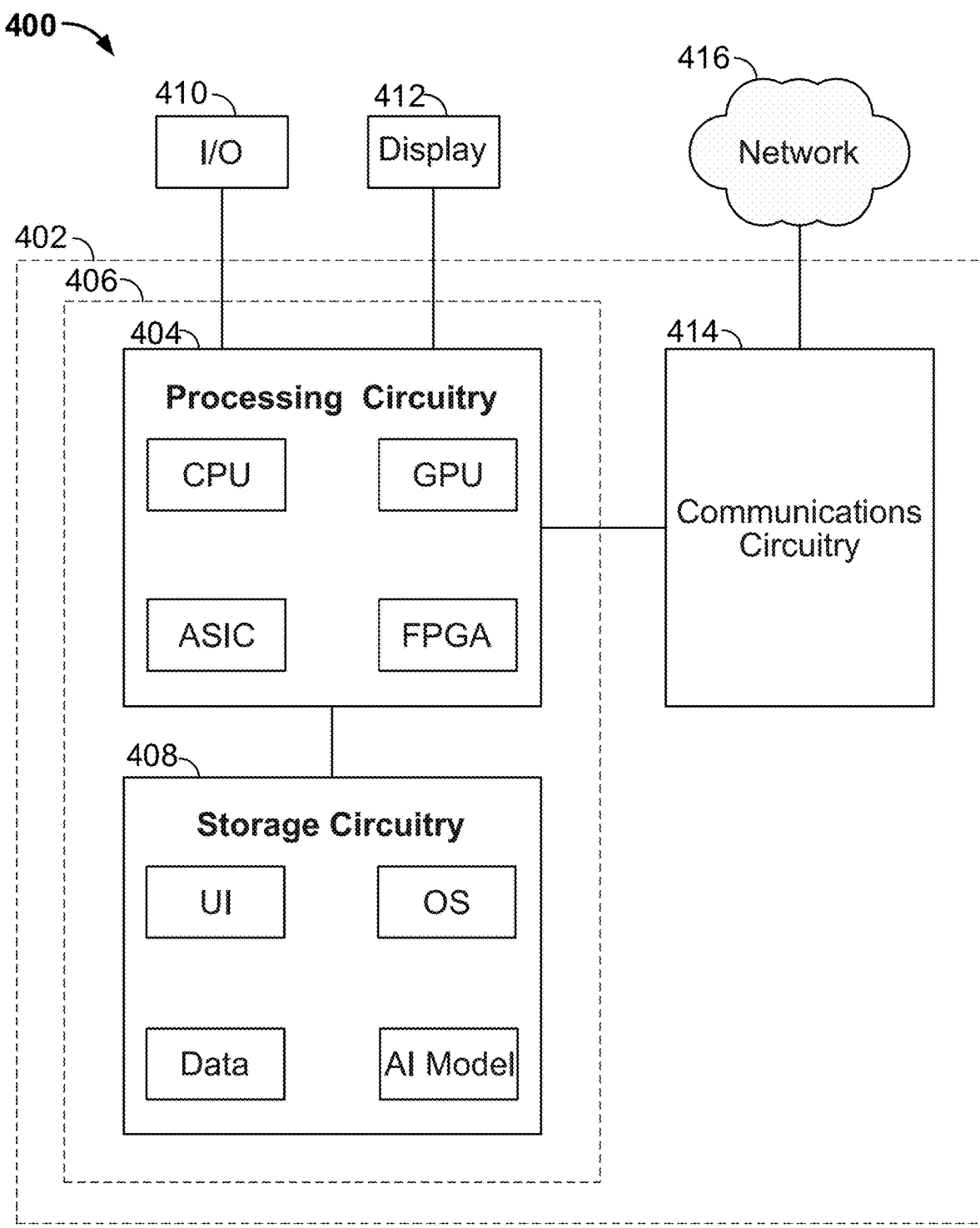
FIG. 4 shows an illustrative diagram of a computer system, in accordance with some embodiments of the disclosure.

FIG. 4 shows an illustrative diagram of a computer system, in accordance with some embodiments of the disclosure. FIG. 4 shows an illustrative, generalized embodiment of illustrative computing device 400. Computing device 400 is depicted having components that are internal and external to computing device 400, for example, internal components 402 includes control circuitry 406, which includes control circuitry 406 and storage circuitry 408, and communications circuitry 414. External components may include input/output (hereinafter "I/O") path 410, display 412 and network 416. In some embodiments, any of I/O path 410, display 412 and network 416 may be included as internal components 402.

I/O path 410 may provide content and data to control circuitry 406 and control circuitry 406 may be used to send and receive commands, requests, and other suitable data using I/O path 410. I/O path 410 may connect control circuitry 406 (and specifically processing circuitry 404) to one or more communications paths (described below). I/O functions may be provided by one or more of these communications paths, but are shown as a single path in FIG. 4 to avoid overcomplicating the drawing.

Control circuitry 406 may be based on any suitable processing circuitry such as control circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), GPUs, etc., and may include a multiple parallel processing cores or redundant hardware. In some embodiments, control circuitry 406 may be distributed across multiple separate processors or processing units, for example, multiple of the same type of processors or multiple different processors. In some embodiments, control circuitry 406 executes instructions for system 100 stored in memory (i.e., storage circuitry 408). Specifically, control circuitry 406 may be instructed by system 100 to perform the functions discussed above and below. For example, system 100 may provide instructions to control circuitry 406 to generate dataset hash 110, model hash 112, assessment results 114, combined results 116, signed results 120, certificate 122, verified results 126, assessment framework 130, dataset hash 132, model hash 134, and/or any other type of data resulting from the implementation of system 100 or any of the processes described herein. In some implementations, any action performed by control circuitry 406 may be based on instructions received from system 100.

In some embodiments, control circuitry 406 may include communications circuitry 414 suitable for communicating with other networks (e.g., network 416) or servers (e.g., server 302 or database 306). The instructions for carrying out the above-mentioned functionality may be stored on database 306. Communications circuitry 414 may include a modem, a fiber optic communications device, an Ethernet card, or a wireless communications device for communicating with other devices. Such communications may involve the Internet or any other suitable communications networks or paths (e.g., via network 416/304). In addition, communications circuitry 414 may include circuitry that enables peer-to-peer communication between devices.

Memory may be an electronic storage device provided as storage circuitry 408 that is part of control circuitry 406. As referred to herein, the phrase "electronic storage device" or "storage device" should be understood to mean any device for storing electronic data, computer software, or firmware, such as random-access memory, read-only memory, hard drives, optical drives, solid state devices, quantum storage devices, or any other suitable fixed or removable storage devices, and/or any combination of the same. Storage circuitry 408 may be used to store various types of data herein, such as validation dataset 102, model 104, assessment frameworks 108, hashing formulas used to compute dataset hash 110 and model hash 112, private key 118, signed results 120, certificate 122, verified results 126, PKI 128, the hash function used to compute validation dataset hash 132 and model hash 134, the signed code for assessment service 106, and the signed code for verification service 124. Nonvolatile memory may also be used (e.g., to launch a boot-up routine and other instructions). Cloud-based storage (e.g., database 306 when communicatively coupled to server 302 via the Internet) may be used to supplement storage circuitry 408 or instead of storage circuitry 408.

A user may send instructions to control circuitry 406 using I/O path 410 using an external device such as a remote control, mouse, keyboard, touch screen, etc. In some embodiments, control circuitry 406 correlates a user input with a location of a user interface element and performs an action based on the selected user interface element. Display 412 may be provided as a stand-alone device or integrated with other elements of computing device 400. For example, display 412 may be a touchscreen or touch-sensitive display and may be combined with I/O path 410.

System 100 may be implemented using any suitable architecture. For example, it may be a stand-alone application wholly implemented on computing device 400. In such an approach, instructions of the application are stored locally (e.g., in storage circuitry 408). In some embodiments, system 100 is a client/server-based application. Data for use by a thick or thin client implemented on computing device 400 is retrieved on demand by issuing requests to a server remote to the computing device 400. In some embodiments, system 100 is downloaded and interpreted or otherwise run by an interpreter or virtual machine (run by control circuitry 406).

The aspects outlined above of FIG. 4 may be combined in any suitable combination, taken in part, or as a whole.

Figure 5:
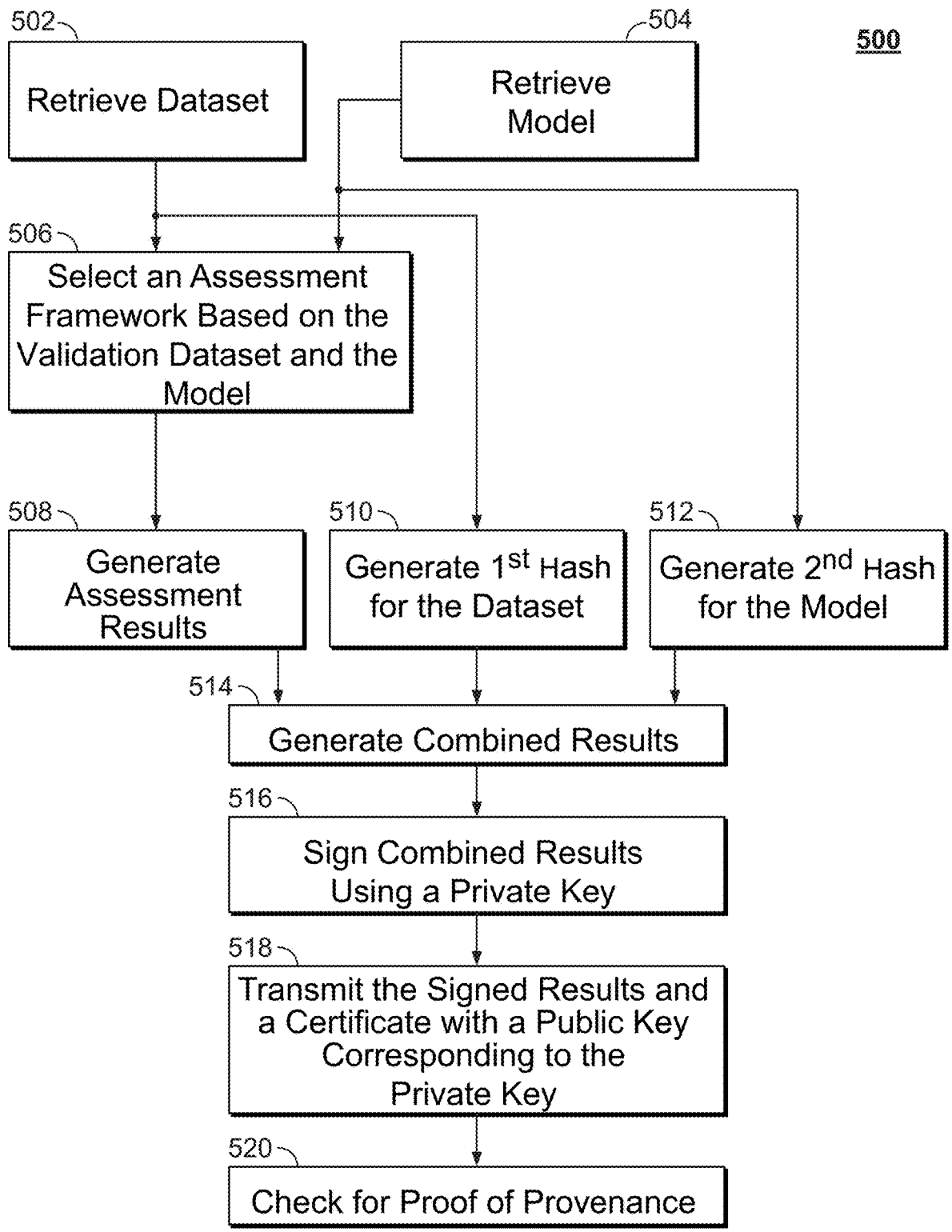
FIG. 5 shows an illustrative flowchart of a process for generating assessment results having provable provenance, in accordance with some embodiments of the disclosure.

FIG. 5 shows an illustrative flowchart of a process 500 for generating assessment results having provable provenance, in accordance with some embodiments of the disclosure. For example, system 100 implementing process 500 may be encoded onto a non-transitory storage medium (e.g., storage circuitry 408) as a set of instructions to be decoded and executed by processing circuitry (e.g., control circuitry 406). Processing circuitry may, in turn, provide instructions to other sub-circuits contained within control circuitry 406. It should be noted that process 500, or any step thereof, could be performed on, or provided by, any of the devices shown in FIGS. 1, 3 and 4.

In some embodiments, process 500 begins at 502, where system 100, running on control circuitry 406, retrieves a dataset (e.g., validation dataset 102). For example, control circuitry 406 may retrieve validation dataset 102 comprising multiple loan application packages from database 306 (e.g., database 306 on storage circuitry 408, when stored locally, or via network 304, when stored remote to control circuitry 406). In some embodiments, process 500 begins at 504, where system 100, running on control circuitry 406, retrieves an AI model. For example, control circuitry 406 may retrieve model 104 trained to predict whether a loan applicant will default on a loan based on a loan application package, from database 306 (e.g., on storage circuitry 408, when stored locally, or via network 304, when stored remote to control circuitry 406). In some embodiments, 502 and 504 may occur simultaneously (i.e., control circuitry 406 may receive, via network 416, both of validation dataset 102 and model 104 in one or more packets). For example, the assessment service 106 may receive both validation dataset 102, comprising the loan application packages, and model 104, comprising an AI model trained to predict whether a loan granted on a package will default, from a third-party user of the assessment service (e.g., client 308). In some embodiments, control circuitry 406 may initiate retrieval of validation dataset 102 and model 104. For example, control circuitry 406 may transmit a request to client 308 for a validation dataset and/or a model. In response to receiving the request, client 308 may transmit validation dataset 102 and/or model 104 to server 302 (e.g., a server configured to run an assessment on validation dataset 102 and model 104). Although FIG. 5 is depicted where control circuitry 406 receives both a dataset and a model, in some embodiments, control circuitry 406 may receive only one of the dataset or the model.

At 506, control circuitry 406 selects an assessment framework (e.g., assessment framework 108) based on the validation dataset (e.g., validation dataset 102) and/or the model (e.g., model 104). An exemplary process for selecting an assessment framework is described with respect to FIG. 6. The assessment framework (e.g., assessment framework 108) may be selected from a plurality of assessment frameworks stored in database 306 or control circuitry 406. The plurality of assessment frameworks may comprise different functionalities, resulting value metrics, and/or different requirements regarding inputs of validation dataset 102 and/or model 104. For example, an assessment framework targeted at identifying racial and/or gender bias in an AI model may be selected by control circuitry 406 for the assessment of an AI model used to recommend to hire or not to hire job applicants by analyzing applicants' resumes. In another example, an assessment framework for assessing the performance of an AI model may be selected by control circuitry 406 for an AI model used for optical character recognition (OCR).

In some embodiments, control circuitry 406 may run each of the plurality of assessment frameworks that are compatible with model 104 and/or validation dataset 102. For example, control circuitry 406 may identify a function or variable instantiated within model 104 to identify a type of output of model 104 (e.g., identify that model 104 outputs a probability). When control circuitry 406 determines that model 104 outputs a probability (e.g., a probability that a loan will default), control circuitry 406 may run each of the assessment frameworks that can be run on a probability function (e.g., an assessment for fairness, an assessment of model performance, etc.).

In some embodiments, control circuitry 406 may receive a request from client 308 identifying a specific assessment to run on validation dataset 102 and model 104. For example, control circuitry 406 may receive (over network 304) a communication from client 308 identifying a specific one or more assessments, of the plurality of assessments on database 306, to run on model 104 and validation dataset 102. In such embodiments, control circuitry 406 may select the assessment framework(s) identified by client 308.

At 508, control circuitry 406 generates assessment results by, for example applying the selected assessment framework 108 to validation dataset 102 and/or model 104. An exemplary process for generating the assessment results in accordance with some embodiments of the present disclosure is described with respect to FIG. 7. For example, control circuitry 406 may input validation dataset 102 (e.g., the validation dataset comprising the loan application packages) to model 104 (e.g., the model used to predict whether a loan will default in the future based on a loan application package) to generate output (e.g., a vector comprising predictions on whether a given loan will default in the future, a recommendation on whether to grant the loan, a maximum loan amount, etc.). Control circuitry 406 may generate the assessment results by, for example, comparing the number of loans having a recommendation to grant the loan across races. In some embodiments, control circuitry 406 may evaluate the assessment results and make a determination based on the results. For example, control circuitry 406 may determine that a bias exists in the model when a statistically significant disparity exists in the number of loans granted for applications corresponding to a first race when compared to applications corresponding to a second race.

At 510, assessment service 106, using control circuitry 406, generates a first hash value for the dataset (e.g., validation dataset 102). Control circuitry 406 may generate the first hash value by applying a one-way hashing function (e.g., SHA) to validation dataset 102. By generating a hash for the dataset, control circuitry 406 (e.g., via verification service 124) may confirm that a dataset received by verification service 124 is the same dataset used by assessment service 106 to generate the assessment results. Similarly, at 512, control circuitry 406 generates a second hash value for the model (e.g., model 104). For example, control circuitry 406 may generate the second hash value by applying a one-way hashing function (e.g., SHA) to the weights and code of model 104. By generating the second hash value for the model, control circuitry 406 (e.g., via verification service 124) may confirm that a model received by verification service 124 is the same model used by assessment service 106 to generate the assessment results. In some embodiments, control circuitry 406 may apply the techniques described below for generating hash values for the retrieved validation dataset 102 and model 104. Although process 500 is depicted having a first hash for the dataset generated at 510 and a second hash generated for the model at 512, in some embodiments, control circuitry 406 may only generate one of the hash for the dataset or the hash for the model.

In some embodiments, control circuitry 406 may perform 508 simultaneously and/or in parallel with 510 and/or 512. In some embodiments, assessment service 106, using control circuitry 406, performs 508, 510, and 512 sequentially in a pre-determined order (e.g., in an order saved in database 306). For example, assessment service 106 may first generate the first hash value at 510, before generating the second hash value at 512, before generating assessment results at 508. Additionally, some steps may occur simultaneously before or after other steps. For example, assessment service 106 may first generate assessment results 508 before performing 510 and 512, generating the first hash for validation dataset 110 and/or the second hash for the model 104.

At 514, control circuitry 406 generates combined results comprising the assessment results (e.g., assessment results 114), the first hash for the dataset (e.g., dataset hash 110), and the second hash for the model (e.g., model hash 112). In some embodiments, control circuitry 406 generates combined results 116 based on assessment results 114 (e.g., from 508), dataset hash 110 (e.g., from 510), and model hash 112 (e.g., from 512). In some embodiments, control circuitry 406, at 514, may create a data structure to hold assessment results 114, dataset hash 110, and model hash 112. Although the data structure is described comprising three fields, any number of fields and any data structure may be used without departing from the scope of the present disclosure. For example, control circuitry 406 may generate a vector having three fields available to be filled with assessment results 114 (e.g., one or more vectors comprising the assessment results), dataset hash 110, and model hash 112. In some embodiments, 514 may be broken up further so that assessment service 106 (e.g., via control circuitry 406) combines the first hash value for the validation dataset (e.g., dataset hash 110) and the second hash value for the model (e.g., model hash 112) prior to combining the hash values with assessment results 114. In some embodiments, control circuitry 406 may apply the techniques described below with respect to FIG. 8 when generating the combined results.

At 516, control circuitry 406 encrypts the combined results (e.g., combined results 116) using a private key. For example, control circuitry 406 may encrypt combined results 116 (e.g., the vector comprising assessment results 114, dataset hash 110, and model hash 112) using private key 118 of assessment service 106. Private key 118 may be stored locally to assessment service 106 (e.g., on storage circuitry 408) or may be stored remote to assessment service 106 (e.g., on storage circuitry 408 of a server remote to assessment service 106). In some embodiments, private key 118 may correspond to certificate 122, which comprises a public key (e.g., PKI 128), for verifying the signature of signed results 120. In some embodiments, assessment service 106 provides certificate 122 to verification service 124 so that verification service 124 can verify the signature of signed results 120. By signing combined results 116 to create signed results 120, verification service 124 may confirm that the signed results have not been tampered with prior to verifying the assessment results.

At 518, assessment service 106, via control circuitry 406, transmits the signed results (e.g., signed results 120) and the certificate with the public key corresponding to the private key (e.g., certificate 122 comprising PKI 128 corresponding to private key 118) to a third party (e.g., verification service 124, an auditor, etc.). For example, control circuitry 406 may transmit, over network 304 one or more packets comprising signed results 120 and/or certificate 122. In some embodiments, signed results 120 and certificate 122 may be stored, by control circuitry 406, prior to transmission. For example, control circuitry 406 may store signed results 120 and certificate 122 in a database (e.g., database 306) prior to or simultaneously with transmitting signed results 120 and certificate 122 to the third party (e.g., verification service 124, an auditor, etc.). In some embodiments, control circuitry 406 may establish a secure communication channel prior to transmitting signed results 120 and certificate 122 (e.g., by establishing a communication channel secured using TLS prior to transmission). In some embodiments, encrypted, assessment service 106 may transmit signed results 120 and certificate 122 appreciably simultaneously or may follow a different predetermined order, such as transmitting certificate 122 before transmitting signed results 120.

At 520, a third party (e.g., verification service 124, an auditor, etc.) may check for proof of provenance by, for example, applying the processes described below with respect to FIG. 8 and/or FIG. 9. In some embodiments, verification service 124 (e.g., via control circuitry 406) may determine a failed proof of provenance for the combined results from the assessment service when the verification service cannot successfully use PKI 128 from certificate 122 to verify the signature of signed results 120. In some embodiments, verification service 124 determines that the proof of provenance fails after verification service 124 successfully verifies the signature of signed results 120 using public key 128. For example, verification service 124 may determine that proof of provenance fails when verification service 124 computes the hash value of validation dataset 102 and that hash value does not match dataset hash 132. As another example, verification service 124 may determine that proof of provenance fails when verification service 124 computes the hash value of model 104 and that hash does not match model hash 134.

It is contemplated that the steps or descriptions of FIG. 5 may be used with any other embodiment of this disclosure.

In addition, the descriptions described in relation to the algorithm of FIG. 5 may be done in alternative orders or in parallel to further the purposes of this disclosure.

Figure 6:
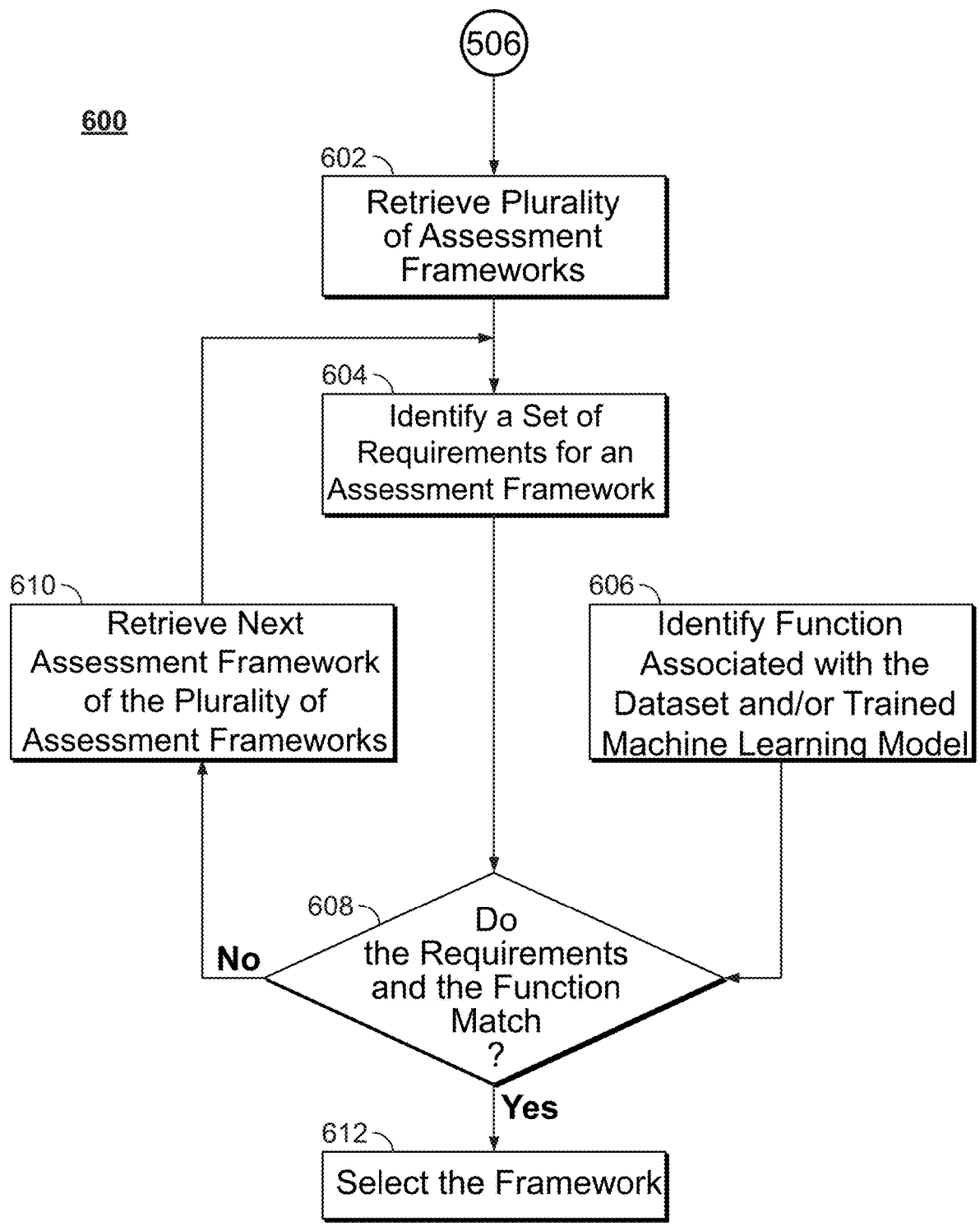
FIG. 6 shows an illustrative flowchart of a process for selecting an assessment framework, in accordance with some embodiments of the disclosure.

FIG. 6 shows an illustrative flow chart of a process for selecting an assessment framework, in accordance with some embodiments of the disclosure. For example, system 100 implementing process 600 may be encoded onto a non-transitory storage medium (e.g., storage circuitry 408) as a set of instructions to be decoded and executed by processing circuitry (e.g., processing circuitry 404). Processing circuitry may, in turn, provide instructions to other sub-circuits contained within control circuitry 406. It should be noted that process 600, or any step thereof, could be performed on, or provided by, any of the devices shown in FIGS. 3-4. In some embodiments, method 600 may be implemented at 506 of FIG. 5.

Process 600 begins at 602, where system 100, running on control circuitry 406, retrieves a plurality of assessment frameworks. For example, control circuitry 406 may retrieve a plurality of assessment frameworks from database 306 (e.g., on storage circuitry 408, when stored locally, or via network 304, when stored remote to control circuitry 406). In some embodiments, each assessment framework of the plurality of assessment frameworks is associated with a set of requirements. For example, an assessment framework that evaluates whether a bias exists in a model may require that the model outputs a probability and that the validation dataset includes race data. In some embodiments, control circuitry 406 retrieves the plurality of assessment frameworks by querying database 306 for a list of assessment frameworks stored on database 306. For example, control circuitry 406 may transmit a query over network 304 to database 306 requesting a list of available assessment frameworks and/or the requirements associated with each assessment framework. In some embodiments, 602 may occur substantially simultaneously to other actions, such as 502 and/or 504 from FIG. 5.

At 604, assessment service 106, via control circuitry 406, identifies a set of requirements for an assessment framework (e.g., a selected assessment framework of the plurality of assessment frameworks). For example, control circuitry 406 may identify a first framework, from the plurality of assessment frameworks retrieved at 602, that evaluates the fairness of a model. The assessment framework (e.g., assessment framework 108) may be associated with a set of requirements that should be present in the model and/or validation dataset to run the assessment. For example, control circuitry 406 may determine that a framework to evaluate the fairness of a model may require that the model (e.g., model 104) outputs a probability and that the validation dataset (e.g., validation dataset 102) includes a race field. In some embodiments, the assessment service may identify a set of requirements that evaluates the fairness of a dataset. For example, an assessment framework targeted at identifying bias in job hiring may require certain other characteristics to be available in the validation dataset, such as an age.

At 606, assessment service 106, using control circuitry 406, identifies a function associated with the dataset and/or the model. For example, control circuitry 406 may determine that the model (e.g., a model used to predict the probability that a loan granted on a given application will default) is associated with a probability function. When control circuitry 406 determines that the model is associated with a probability function, control circuitry 406 may run one or more assessment frameworks that assess models associated with a probability function. In some embodiments, control circuitry 406 may determine whether the dataset matches the requirements with the assessment framework. For example, control circuitry 406 may determine whether the assessment framework has any requirements associated with the validation dataset, and if so, may compare those requirements with characteristics of the validation dataset. For example, when running an assessment on dataset comprising race data, control circuitry 406 may select an assessment framework that evaluates for race based fairness within the dataset. When control circuitry 406 determines that the characteristics of the dataset match the requirements associated with the assessment framework, control circuitry 406 may run the selected assessment framework.

At 608, assessment service 106, using control circuitry 406, determines whether the identified requirements of the assessment framework and the characteristics and function associated with the dataset and model match. As described above, control circuitry 406 may determine that the requirements of the assessment framework match the function associated with the model and/or validation dataset when the model is associated with a probability function and when the assessment framework assesses the performance of a probability-based model. When control circuitry 406 determines that the identified requirements and function do not match, control circuitry 406 may proceed to 610, where control circuitry 406 retrieves a next assessment framework of the plurality of assessment frameworks. For example, at 610, control circuitry 406 may select a second assessment framework (e.g., assessment framework 108) from the plurality of assessment frameworks stored in database 306. Control circuitry 406 may iterate through 604 and 608 again to determine whether the requirements of the second assessment framework match the function associated with the dataset (e.g., validation dataset 102) and the model (e.g., model 104). In some embodiments, 604, 608, and 610 repeat until the control circuitry 406 rejects all frameworks and/or determines that the requirements of an assessment framework match the characteristics and function of the validation dataset 102 and model 104. In some embodiments, assessment service 106 may identify the characteristics and function associated with validation dataset 102 and model 104 once while control circuitry 406 cycles through 604, 608, and 610 in order to find a match. In some embodiments, at 612, in the case that the requirements of assessment framework 108 and the characteristics/function of validation dataset 102 and model 104 match, the assessment service may select assessment framework 108 as the assessment to use to generate assessment results 114. In some embodiments, once assessment service 106 identifies an assessment framework with a set of requirements that match the function of validation dataset 102 and/or model 104, assessment service 106 may select that assessment framework and discontinue its search for other potential assessment frameworks to complete the assessment.

It is contemplated that the steps or descriptions of FIG. 6 may be used with any other embodiment of this disclosure. In addition, the descriptions described in relation to the process of FIG. 6 may be done in alternative orders or in parallel to further the purposes of this disclosure.

Figure 7:
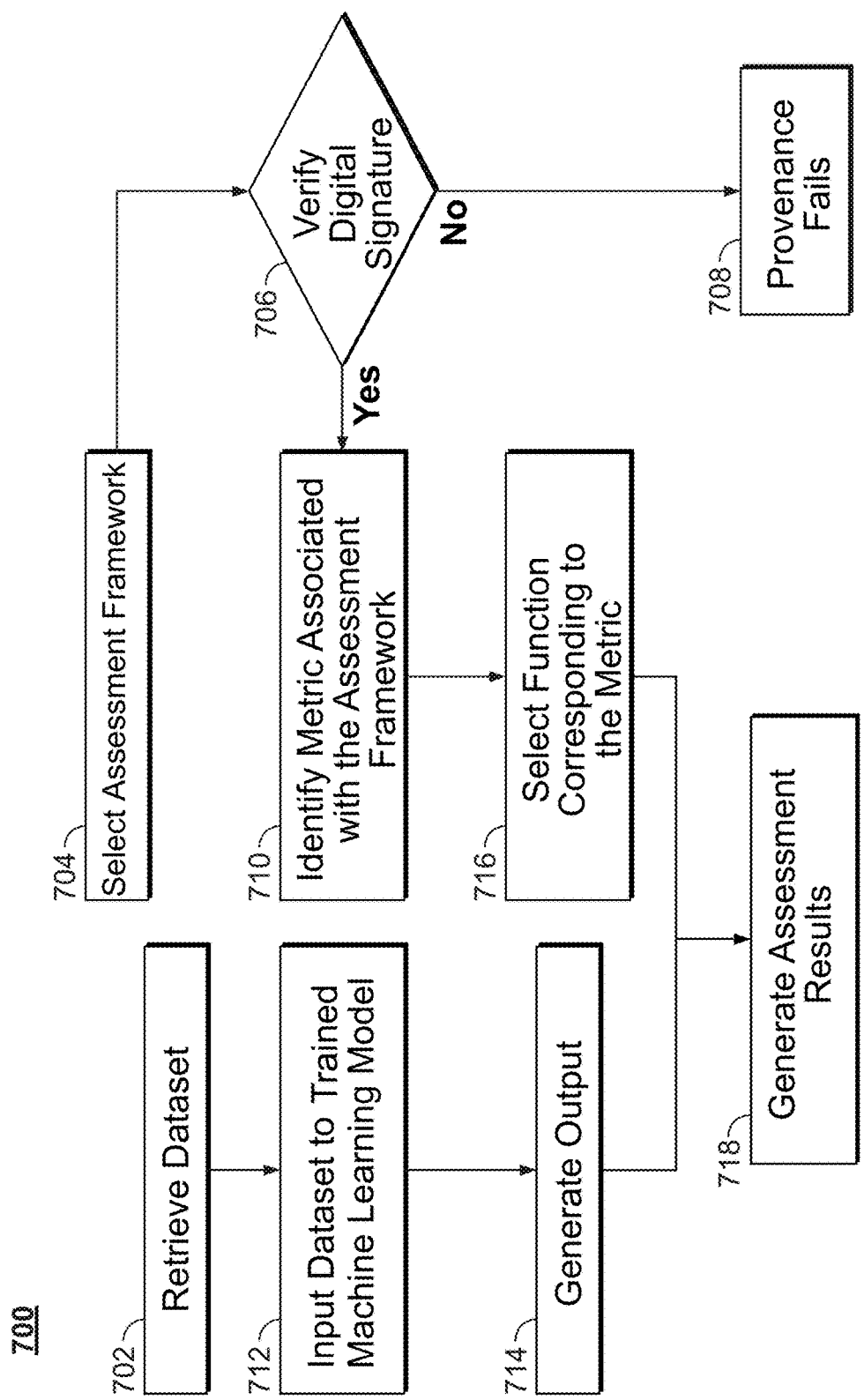
FIG. 7 shows an illustrative flowchart of a process for generating assessment results, in accordance with some embodiments of the disclosure.

FIG. 7 shows an illustrative flow chart of a process for generating assessment results, in accordance with some embodiments of the disclosure. For example, system 100 implementing process 700 may be encoded onto a non-transitory storage medium (e.g., storage circuitry 408) as a set of instructions to be decoded and executed by processing circuitry (e.g., processing circuitry 404 of control circuitry 406). Processing circuitry may, in turn, provide instructions to other sub-circuits contained within control circuitry 406.

It should be noted that process 700, or any step thereof, could be performed on, or provided by, any of the devices shown in FIGS. 3-4.

In some embodiments, process 700 may correspond to 508 of FIG. 5 where control circuitry 406 generates assessment results (e.g., assessment results 114) for a selected assessment framework (e.g., assessment framework 108).

At 702 control circuitry 406 retrieves a dataset (e.g., validation dataset 102). For example, control circuitry 406 on server 302 may retrieve validation dataset 102 over network 304 from control circuitry 406 of client 308. In some embodiments, validation dataset 102 may be stored locally to control circuitry 406 (e.g., on storage circuitry 408) or may be stored remote to control circuitry 406 (e.g., on storage circuitry 408 of database 306). At 712 control circuitry 406 inputs the dataset to a trained machine learning model (e.g., inputs validation dataset 102 to model 104/200) to generate output at 714. For example, as described above, control circuitry 406 may input the validation dataset comprising multiple loan application packages into a trained machine learning model that predicts whether a loan application will default in the future. In some embodiments, control circuitry 406 uses the output generated by model 104/200 using validation dataset 102 to perform an assessment of the model.

At 704 control circuitry 406 selects an assessment framework (e.g., assessment framework 108). For example, control circuitry 406 may receive a request from client 308 identifying a particular assessment framework. In such embodiments, control circuitry 406 may select the assessment framework, from a plurality of available assessment frameworks, matching the request from client 308. An additional process for selecting an assessment framework is described above with respect to FIG. 6.

At 706, control circuitry 406 verifies a digital signature of the assessment framework. For example, control circuitry 406 may receive the assessment framework (e.g., assessment framework 108) over a network connection (e.g., network 304) from database 306. Prior to transmission over network 304, control circuitry 406 (e.g., of database 306) may sign a packet comprising the assessment framework using a private key of database 306. Database 306, via control circuitry 406, may transmit to server 302 the signed assessment framework along with a certificate corresponding to the private key of database 306. When server 302 receives the assessment framework, control circuitry 406 of server 302 may first verify whether a signature of the assessment framework is valid prior to utilizing the assessment framework to generate assessment results. If the signature of the assessment framework cannot be verified (e.g., using the certificate), provenance fails at 708. For example, if control circuitry 406 receives an assessment framework and the signature associated with the assessment framework cannot be verified, control circuitry 406 will conclude that the assessment framework has been tampered with and cannot be trusted. Accordingly, no assessment results are generated by control circuitry 406 and provenance will fail. By verifying the digital signature of the assessment framework prior to utilizing the assessment framework, in combination with some of the additional steps described herein, control circuitry 406 can provide provable provenance for the assessment results.

At 710, control circuitry 406 identifies a metric associated with the assessment framework. For example, control circuitry 406 may retrieve an assessment framework (e.g., assessment framework 108) to assess the fairness of a model. The assessment framework may be associated with a first metric to evaluate whether a gender bias exists in a model, a second metric to evaluate whether a racial bias exists in the model, etc. At 716, control circuitry 406 selects a function corresponding to the metric to, for example, generate the assessment results based on the metric. For example, when the metric is to evaluate whether a racial bias exists in a model, control circuitry 406 may select a function to identify all of the output by model 104 corresponding to a first race and all of the output corresponding to a second race. Control circuitry 406 may generate a value for the metric by applying the function to the output of the model. For example, control circuitry 406 may generate statistics representing how often loan applicants from the first race are predicted to default (and would therefore likely be denied for the loan) as compared to applicants from the second race. In some embodiments, control circuitry 406 transmits the value for the metric (as computed above) as the assessment results at 718. In other embodiments, control circuitry 406 may compute multiple metrics to include in the generated assessment results. For example, control circuitry 406 may include a first metric corresponding to a race-based bias, a second metric corresponding gender-based bias, and a third metric corresponding to an overall performance of the model.

It is contemplated that the steps or descriptions of FIG. 7 may be used with any other embodiment of this disclosure. In addition, the descriptions described in relation to the process of FIG. 7 may be done in alternative orders or in parallel to further the purposes of this disclosure.

Figure 8:
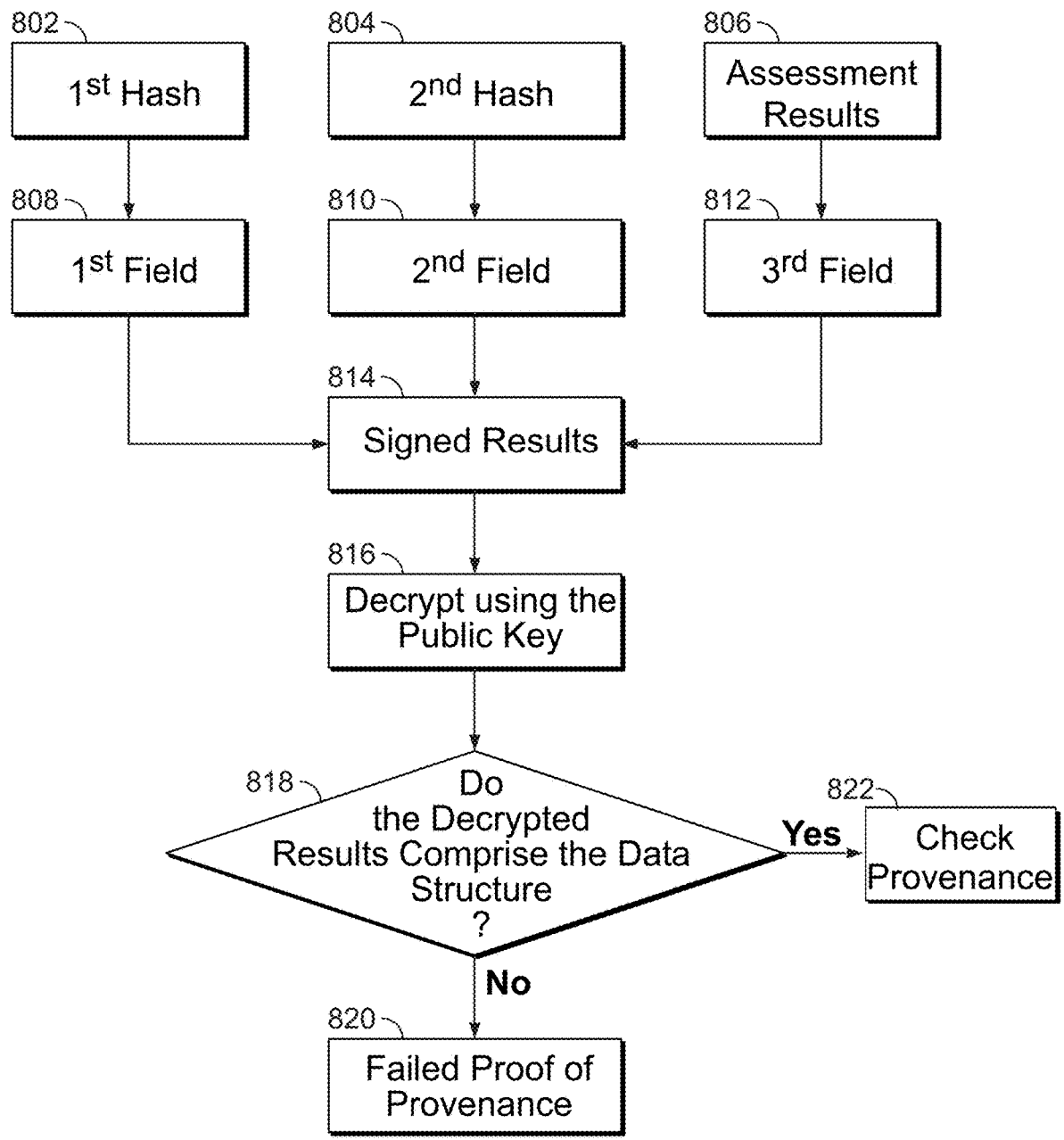
FIG. 8 shows an illustrative flowchart of a process for generating, decrypting, and validating signed results, in accordance with some embodiments of the disclosure.

FIG. 8 shows an illustrative flow chart of a process for generating, decrypting, and validating signed results, in accordance with some embodiments of the disclosure. For example, system 100 implementing process 800 may be encoded onto non-transitory storage medium (e.g., storage circuitry 408) as a set of instructions to be decoded and executed by processing circuitry (e.g., processing circuitry 404 of control circuitry 406). Processing circuitry may, in turn, provide instructions to other sub-circuits contained within control circuitry 406. It should be noted that process 800, or any step thereof, could be performed on, or provided by, any of the devices shown in FIGS. 3-4.

In some embodiments, process 800 includes the creation of a data structure. For example, control circuitry 406 may create a data structure comprising two or more fields to store on database 306 (e.g., on storage circuitry 408, when stored locally, or via network 304, when stored remote to control circuitry 406). In some embodiments, control circuitry 406 may implement some or all of process 800 when generating the combined results at 514 of process 500. Although specific fields of the exemplary data structure are identified in the following paragraphs, any construct used to store and/or transmit data may be used without departing from the scope of the present disclosure. For example, the data structure may be one or more network packets, where, instead of data being stored in unique fields of a vector, data is stored by control circuitry 406 in different network packets and transmitted over a network connection (e.g., network 304).

At 802, assessment service 106, via control circuitry 406, retrieves a first hash value for inclusion in the data structure. For example, control circuitry 406 may retrieve dataset hash 110 from storage circuitry 408 (e.g., after generating the first hash for the dataset at 510 of process 500). In some embodiments, control circuitry 406 may generate the first hash by applying a one-way hashing function (e.g., SHA) to validation dataset 102. In some embodiments, the order of the data within validation dataset 102 does not matter when performing the one-way hashing function (e.g., the hash value will be the same regardless of the order of the elements within validation dataset 102). In some embodiments, the first hash value comprises dataset hash 110 from FIG. 1. In some embodiments, control circuitry 406 may input the first hash value (e.g., dataset hash 110) into the first field of the dataset at 808. For example, the data structure may be a vector with three fields and control circuitry 406 may store dataset hash 110 in the first field of the vector.

At 804, assessment service 106, using control circuitry 406, accesses a second hash value. For example, control circuitry 406 may retrieve model hash 112 from storage circuitry 408 (e.g., after generating the second hash for the model at 512 of process 500). In some embodiments, control circuitry 406 may generate the second hash by applying a one-way hashing function to the model 104/200. For example, control circuitry 406 may apply a one-way hashing function (e.g., SHA) to the code and the stored weights corresponding to model 104/200. In some embodiments, control circuitry 406 may input the second hash value at 810 into the second field of the structure. For example, control circuitry 406 may store model hash 112 in the second field of the vector for combined results 116.

In some embodiments, at 806, assessment service 106, using control circuitry 406, retrieves the assessment results, which in some embodiments may be previously generated by assessment service 106. For example, control circuitry 406 may retrieve the assessment results (e.g., assessment results 114) from storage circuitry 408 that is local to control circuitry 406 or may retrieve the assessment results from remote storage (e.g., from storage circuitry 408 of database 306). Control circuitry 406 may store the assessment results in a third field of the data structure at 812. For example, control circuitry 406 may access combined results 116 and may store the assessment results in the third field of a vector corresponding to combined results 116. In some embodiments, assessment results 114 may be a vector, in such embodiments, control circuitry 406 may store a vector within the third vector field of combined results 116. In some embodiments, the third field comprises one or more additional fields. For example, when assessment results 114 is a vector comprising two fields, control circuitry 406 may store a value in the first field of assessment results 114 in the third field of combined results 116 and may store a value in the second field of assessment results 114 in a fourth field of combined results 116. The abovementioned process for storing second the first hash (e.g., dataset hash 110), the second hash (e.g., model hash 112), and the assessment results (e.g., assessment results 114) is merely exemplary and can be modified to include other methods for storing such data without departing from the scope of the present disclosure. In some embodiments, field allocations may vary upon selected assessment framework 108.

Although the data structure depicted in FIG. 8 comprises three fields. Any number of fields may be used without departing from the scope of the present disclosure. For example, when assessment service 106 runs an assessment on only a dataset (e.g., validation dataset 102), the data structure may comprise two fields, a first field for a hash value of validation dataset 102 and a second field for the assessment results (e.g., assessment results 806). In another example, when assessment service 106 runs an assessment on only a model (e.g., model 104) the data structure may comprise two fields, a first field for the assessment results (e.g., assessment results 806) and a second field for a hash value of model 104.

At 814, assessment service 106, via control circuitry 406, signs the combined results to create signed results 120. For example, control circuitry 406 may retrieve private key 118 (e.g., a private key corresponding to assessment service 106) and may use the private key to generate a signature for combined results 116. The signature may be added to combined results 116 (e.g., the results comprising dataset hash 110, model hash 112, and assessment results 114) to create signed results 120. In some embodiments, where each of dataset hash 110, model hash 112, and assessment results 114 are stored separately (e.g., instead of being stored within a single data structure, such as combined results 116), control circuitry 406 may individually sign each of dataset hash 110, model hash 112, and assessment results 114 (e.g., using private key 118) to create a signed dataset hash, a signed model hash, and a signed assessment results, respectively. Collectively, the signed dataset hash, the signed model hash, and the signed assessment results may be referred to herein as signed results (e.g., signed results 120). In such embodiments, control circuitry 406 may individually transmit each of the signed dataset hash, the signed model hash, and the signed assessment results to a verification service (e.g., verification service 124, such as an auditor). By signing dataset hash 110, model hash 112, and assessment results 114 (either as a combined data structure, such as combined results 116, or individually), control circuitry 406 provides a detectable method of ensuring that none of dataset hash 110, model hash 112, or assessment results 114 are tampered with when the results are transmitted to another system or service (e.g., when transmitted to verification service 124 over network 304). Because verification service 124 can detect when a malicious actor tampers with the signed results (e.g., signed results 120), verification service 124 can detect when the provenance for the assessment results should fail (e.g., in the event of tampering).

In some embodiments, assessment service 106, via control circuitry 406, transmits the signed results to a verification service, such as verification service 124. In such embodiments, control circuitry 406 may additionally transmit certificate 122 (corresponding to private key 118) so that verification service 124 can verify the signature of signed results 120. Verification service 124 may receive the signed results (e.g., over network 304) and may use the signed results to perform a verification of the model assessment (e.g., an audit to confirm that the model assessment was accurately generated). At 816, verification service 124, using control circuitry 406, may verify the signature of signed results 120. Verification service 124 may receive signed results 120 from assessment service 106, and certificate 122 from a trusted certificate storage (e.g., database 306). Verification service 124 identifies a public key, such as PKI 128 (e.g., based on certificate 122) and verifies the signature of the results based on PKI 128. For example, control circuitry 406 may use PKI 128 to decrypt the signature and may compare a hash value of the decrypted signature to a hash value of the message (e.g., a hash value for combined results 116), when the hash value of the decrypted signature matches the hash value for combined results 116, control circuitry 406 may determine that the decrypted results comprise the data structure at 818. When the hash of the decrypted signature does not match the hash of the message (e.g., the hash of combined results 116), control circuitry 406 may determine that the proof of provenance has failed at 820 because tampering has occurred during transmission, thus indicating that the assessment results cannot be trusted. By verification service 124 verifying the signature of signed results 120, verification service 124 can detect when tampering occurs. When verification service 124 detects tampering, verification service 124 will know that the proof of provenance has failed. When the signed results do comprise the data structure (e.g., because the hash value of the data structure matches the expected hash in the signature) control circuitry 406 may proceed to 822, where control circuitry 406 performs additional functions to verify the provenance of the assessment results (described further below with respect to FIG. 9).

It is contemplated that the steps or descriptions of FIG. 8 may be used with any other embodiment of this disclosure. In addition, the descriptions described in relation to the algorithm of FIG. 8 may be done in alternative orders or in parallel to further the purposes of this disclosure.

Figure 9:
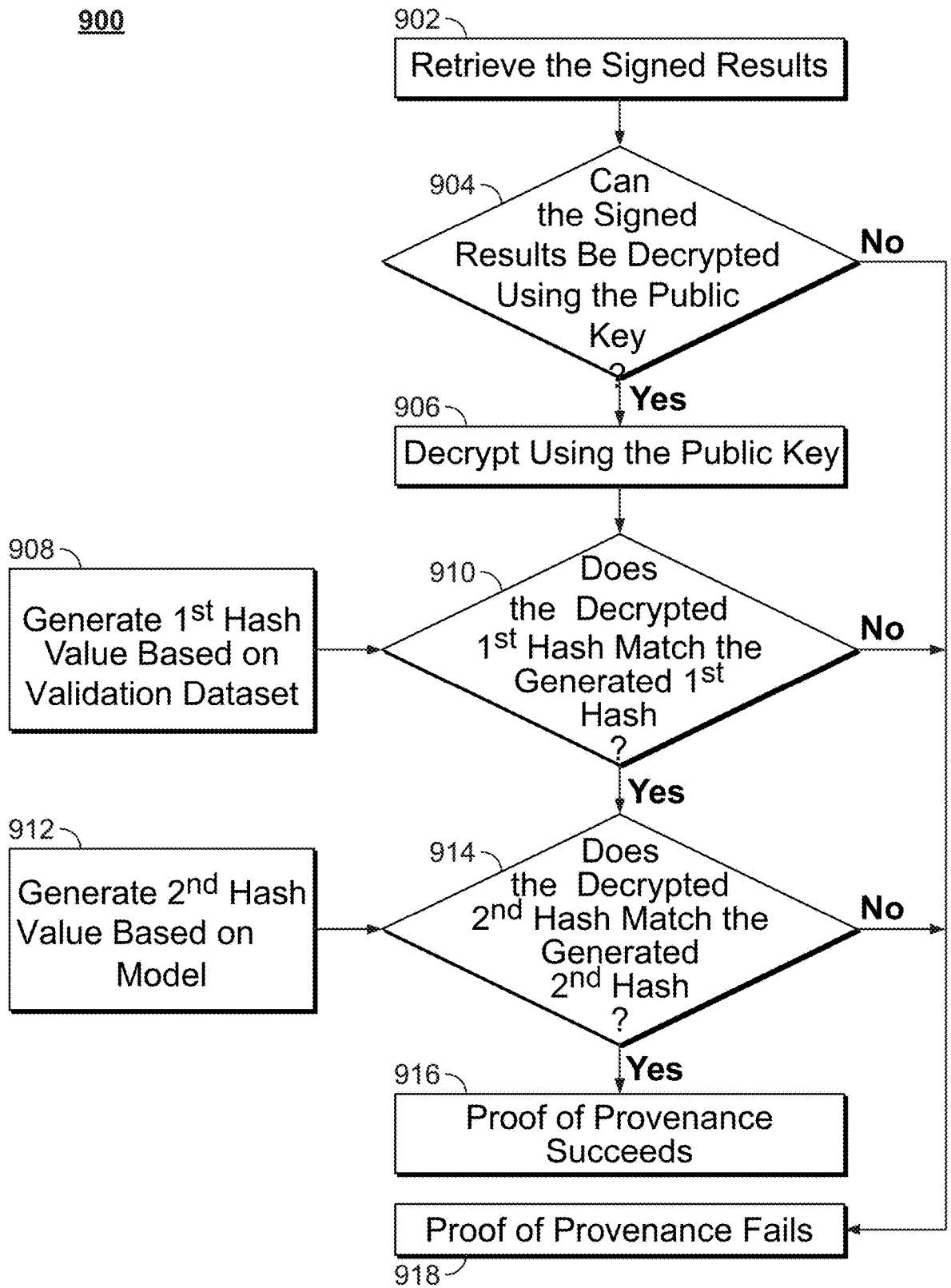
FIG. 9 shows an illustrative flowchart of a process for proving the provenance of assessment results, in accordance with some embodiments of the disclosure.

FIG. 9 shows an illustrative flow chart of a process for proving the provenance of assessment results, in accordance with some embodiments of the disclosure. For example, system 100 implementing process 900 may be encoded onto non-transitory storage medium (e.g., storage circuitry 408) as a set of instructions to be decoded and executed by processing circuitry (e.g., processing circuitry 404 of control circuitry 406). Processing circuitry may, in turn, provide instructions to other sub-circuits contained within control circuitry 406. It should be noted that process 900, or any step thereof, could be performed on, or provided by, any of the devices shown in FIGS. 3-4.

Process 900 begins at 902, where verification service 124, via control circuitry 406, retrieves the signed results. For example, control circuitry 406 may receive the signed results (e.g., signed results 120) over network 304 from server 302 running assessment service 106.

At 904, control circuitry 406 determines whether the signed results can be decrypted using the public key. For example, control circuitry 406 may retrieve PKI 128, which in some embodiments corresponds to certificate 122, from a trusted certificate storage database (e.g., database 306) or from assessment service 106 via network 304. Control circuitry 406 may utilize PKI 128 to decrypt the signature of signed results 120. When control circuitry 406 confirms that the signature of signed results 120 matches the expected signature of assessment service 106 (e.g., because a hash value determined by decrypting the signature of signed results 120 matches a hash value of combined results 116), control circuitry 406 may proceed to 906, where control circuitry 406 decrypts the message using the public key at 906. If control circuitry 406 cannot verify the signature of assessment service 106, control circuitry 406 proceeds to 918, where control circuitry 406 determines that the proof of provenance has failed (e.g., because the signed results were tampered with).

At 906, control circuitry 406 decrypts the signed results using the public key. For example, when the message in signed results 120 is encrypted, control circuitry 406 may use PKI 128 to decrypt the payload of the message. Control circuitry 406 may generate verified results 126 based on the decryption. For example, control circuitry 406 may generate verified results comprising decrypted assessment results 130, decrypted dataset hash 132, and decrypted model hash 134 by extracting each of assessment results 130, decrypted dataset hash 132, and decrypted model hash 134 from a data structure of signed results 120. In some embodiments, verified results 126 comprise the data structure of combined results 116 (e.g., a vector comprising dataset hash 110, model hash 112 and assessment results 114).

At 908, control circuitry 406 generates a first hash value based on the validation dataset. For example, verification service 124 may receive validation dataset 102 and model 104 from client 308. Verification service 124, via control circuitry 406, may generate a first hash for the received validation dataset at 908 and a second hash value for the received model at 912. Control circuitry 406 may compare the generated first hash for the received validation dataset and a second hash value for the received model to dataset hash 132 (at 910), and model hash 134 (at 914), respectively, to confirm whether the validation dataset and the model used to generate the assessment results are the same model and validation dataset provided by client 308 to verification service 124. In other words, if client 308 is trying to cheat the validation by providing a different model and/or validation dataset than model 104 and validation dataset 102 used for the assessment, verification service 124 will detect that the model and/or the validation dataset was not used to perform the assessment and provenance will fail. For example, if control circuitry 406 determines, at 910, that the decrypted dataset hash 132 does not match the first hash generated for the received validation dataset (e.g., the hash generated at 908), control circuitry 406 proceeds to 918, where proof of provenance fails (e.g., because client 308 has provided a different verification dataset from the one used during the assessment). In contrast, when control circuitry 406 confirms that the generated first hash (e.g., the hash generated at 908) matches dataset hash 132, control circuitry 406 confirms that validation dataset 102 was used to generate the assessment results and is the validation dataset provided by client 308 to perform the assessment.

At 914, control circuitry 406 determines whether the decrypted second hash (e.g., model hash 134) matches the generated second hash (e.g., the hash generated at 912). When control circuitry 406 determines that the decrypted second hash (e.g., model hash 134) does not match the generated second hash (e.g., the hash generated at 912), control circuitry 406 may determine that the model provided by client 308 does not match the model used to perform the assessment (e.g., model 104). Accordingly, proof of provenance fails and control circuitry 406 proceeds to 918. In contrast, when control circuitry 406 determines that the decrypted second hash (e.g., model hash 134) does match the generated second hash (e.g., the hash generated at 912), control circuitry 406 may determine that the model provided by client 308 for the verification does match the model used to perform the assessment (e.g., model 104). Accordingly, control circuitry 406 proceeds to 916 where proof of provenance succeeds. In some embodiments, when proof of provenance succeeds control circuitry 406 notifies the client (e.g., client 308 via network 304) that the proof of provenance has succeeded and that verification service 124 will perform the verification of the assessment results. In embodiments where assessment service 106 generates only one hash value (e.g., a hash value of validation dataset 102 or model 104), verification service 124 may determine that the provenance fails after determining that generated hash value does not match a decrypted hash value from the signed results.

In some embodiments, at 918 control circuitry 406 informs a user that the proof of provenance has failed and/or provides one or more reasons for why the proof of provenance has failed. For example, when control circuitry 406 determines that the signed results have been tampered with, control circuitry 406 may send a message over network 304 to client 308 informing the client that the assessment results were tampered with during transmission over network 304, and therefore proof of provenance for the assessment results has failed.

It is contemplated that the steps or descriptions of FIG. 9 may be used with any other embodiment of this disclosure. In addition, the descriptions described in relation to the algorithm of FIG. 9 may be done in alternative orders or in parallel to further the purposes of this disclosure.

By performing a hash on the validation dataset and the model, verification service 124 can verify whether the dataset and the model were used to generate the assessment results. For example, the verification service 124 can generate a first hash value for a validation dataset and second hash value for the model that verification service 124 receives from client 308 and/or assessment service 106. Verification service 124 may then compare the generated first and second hash values to the first and second hash values provided by assessment service 106. If the hash values generated by verification service 124 (e.g., for the validation dataset and the model) match those of assessment service 106, verification service 124 can verify that the validation dataset and the AI model received by verification service 124 are the same as those used by the assessment service 106. If either of the hash values are not the same, proof of provenance fails for the entire assessment. By signing the code for assessment service 106 and/or verification service 124 on signed code, the systems discussed herein (e.g., system 100) can verify whether assessment service 106 or verification service 124 has been tampered with prior to executing the services to perform either the assessment or the verification. When system 100 determines that the signature for either assessment service 106 or verification service 124 fails, provenance for the assessment will fail (e.g., because it cannot be trusted that the assessment was performed properly when the code has been tampered with).

The processes discussed above are intended to be illustrative and not limiting. Any portion of the processes discussed herein may be omitted, modified, combined and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and sequence diagrams, flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for providing provable provenance for an assessment, the method comprising:
receiving at least one of a dataset and a trained machine learning model;
selecting an assessment framework based on the at least one of the dataset and the trained machine learning model;
generating assessment results by applying the assessment framework to the at least one of the dataset and the trained machine learning model;
generating a hash value of the at least one of the dataset and the trained machine learning model;
generating combined results comprising the hash value and the assessment results;
encrypting the combined results using a private key to generate signed results; and
transmitting, over a network, to a client device, the signed results and a certificate comprising a public key corresponding to the private key,
wherein the client device is configured to:
decrypt the signed results using the public key;
receive, over the network, the at least one of the dataset and the trained machine learning model;
identify a decrypted hash value based on the decrypted signed results;
generate a hash value of the received at least one of the dataset and the trained machine learning model; and
determine that the proof of the provenance fails when at least one of:
decryption of the signed results cannot be performed by the client device using the public key,
a decrypted hash value does not match the hash value,
the generated hash value of the received at least one of the dataset and the trained machine learning model does not match the decrypted hash value.

2. The method of claim 1, wherein selecting the assessment framework based on the at least one of the dataset and the trained machine learning model comprises:
retrieving a plurality of assessment frameworks;
identifying a respective set of requirements associated with each assessment framework of the plurality of assessment frameworks; and
selecting the assessment framework based on determining that the respective set of requirements associated with the assessment framework match a function associated with the at least one of the dataset and the trained machine learning model.

3. The method of claim 1, wherein receiving at least one of the dataset and the trained machine learning model comprises receiving both the dataset and the trained machine learning model, and wherein generating assessment results by applying the assessment framework to the at least one of the dataset and the trained machine learning model, comprises:
generating output from the trained machine learning model by inputting the dataset to the trained machine learning model;
identifying a metric associated with the assessment framework;
selecting a function corresponding to the metric; and
generating a value for the metric by applying the function to the output from the trained machine learning model.

4. The method of claim 1, wherein calculating the hash value of the at least one of the dataset and the trained machine learning model comprises applying a one-way hashing function to the at least one of the dataset and the trained machine learning model.

5. The method of claim 4, wherein the one-way hashing function does not rely upon the order of the at least one of the dataset and the trained machine learning model.

6. The method of claim 4, wherein the trained machine learning model comprises code and weights associated with the code, and wherein calculating the hash value comprises applying the one-way hashing function to both the code and the weights associated with the code.

7. The method of claim 1, wherein generating combined results comprises:
generating a data structure comprising a first field and a second field; and storing the hash value in the first field and the assessment result value in the second field.

8. The method of claim 7, wherein the client device is further configured to determine that the proof of provenance fails:
determining whether the decrypted signed results comprise the data structure; and
in response to determining that the decrypted signed results do not comprise the data structure.

9. The method of claim 1, wherein generating assessment results by applying the assessment framework to the at least one of the dataset and the trained machine learning model comprises verifying a digital signature associated with the assessment framework prior to applying the assessment framework to the at least one of the dataset and the trained machine learning model.

10. A system for providing provable provenance for an assessment, the system comprising:
network circuitry, and
control circuitry configured to:
receive at least one of a dataset and a trained machine learning model over the network circuitry;
select an assessment framework based on the at least one of the dataset and the trained machine learning model;
generate assessment results by applying the assessment framework to the at least one of the dataset and the trained machine learning model;
generate a hash value of the at least one of the dataset and the trained machine learning model;
generate combined results comprising the hash value and the assessment results;
encrypt the combined results using a private key to generate signed results; and
transmit, over the network circuitry, the signed results and a certificate comprising a public key corresponding to the private key; and
a client device configured to:
decrypt the signed results using the public key;
receive the at least one of the dataset and the trained machine learning model;
identify a decrypted hash value based on the decrypted signed results;
generate a hash value of the received at least one of the dataset and the trained machine learning model; and
determine that the, proof of the provenance fails when at least one of:
decryption, by the client device the control circuitry, of the signed results cannot be performed using the public key,
a decrypted hash value does not match the hash value,
the generated hash value of the received at least one of the dataset and the trained machine learning model does not match the decrypted hash value.

11. The system of claim 10, wherein the control circuitry is further configured, when selecting the assessment framework based on the at least one of the dataset and the trained machine learning model to:
retrieve a plurality of assessment frameworks;
identify a respective set of requirements associated with each assessment framework of the plurality of assessment frameworks; and
select the assessment framework based on determining that the respective set of requirements associated with the assessment framework match a function associated with the at least one of the dataset and the trained machine learning model.

12. The system of claim 10, wherein receiving at least one of the dataset and the trained machine learning model comprises receiving both the dataset and the trained machine learning model, and wherein the control circuitry is further configured, when generating assessment results by applying the assessment framework to the at least one of the dataset and the trained machine learning model, to:
generate output from the trained machine learning model by inputting the dataset to the trained machine learning model;
identify a metric associated with the assessment framework;
select a function corresponding to the metric; and
generate a value for the metric by applying the function to the output from the trained machine learning model.

13. The system of claim 10, wherein the control circuitry, when calculating the hash value of the at least one of the dataset and the trained machine learning model, is further configured to apply a one-way hashing function to the at least one of the dataset and the trained machine learning model.

14. The system of claim 13, wherein the one-way hashing function does not rely upon the order of the at least one of the dataset and the trained machine learning model.

15. The system of claim 13, wherein the trained machine learning model comprises code and weights associated with the code, and wherein the control circuitry is further configured, when calculating the hash value, to apply the one-way hashing function to both the code and the weights associated with the code.

16. The system of claim 10, wherein the control circuitry is further configured, when generating combined results, to:
generate a data structure comprising a first field and a second field; and
store the hash value in the first field and the assessment result value in the second field.

17. The system of claim 16, wherein the client device is further configured to:
decrypt the signed results using the public key;
determine whether the decrypted signed results comprise the data structure; and
in response to determining that the decrypted signed results do not comprise the data structure, generate an indication that proof of the provenance has failed.

18. The system of claim 16, wherein the control circuitry is further configured, when generating assessment results by applying the assessment framework to the at least one of the dataset and the trained machine learning model, to verify a digital signature associated with the assessment framework prior to applying the assessment framework to the at least one of the dataset and the trained machine learning model.

* * * * *